United States Patent
Kyuma et al.

(10) Patent No.: US 6,445,416 B1
(45) Date of Patent: Sep. 3, 2002

(54) IMAGE PICKUP APPARATUS HAVING ELECTRONIC ZOOM FUNCTION BASED ON OPTICAL ZOOMING FOCAL LENGTH VARIATION WITH TIME

(75) Inventors: Kenji Kyuma, Saitama-ken; Hiroto Ohkawara, Ibaraki-ken, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/672,073

(22) Filed: Jun. 26, 1996

(30) Foreign Application Priority Data

Jun. 30, 1995 (JP) .............................. 7-165921
Jul. 24, 1995 (JP) .............................. 7-187170

(51) Int. Cl.⁷ .............................................. G03B 17/00
(52) U.S. Cl. ...................................... 348/358; 340/240
(58) Field of Search ................................ 348/358, 347, 348/335, 375, 240

(56) References Cited

U.S. PATENT DOCUMENTS

| | | | | |
|---|---|---|---|---|
| 4,840,470 A | * | 6/1989 | Ohtake | 396/72 |
| 4,847,650 A | * | 7/1989 | Iida et al. | 396/82 |
| 5,003,399 A | * | 3/1991 | Ishimaru et al. | 348/361 |
| 5,159,370 A | * | 10/1992 | Takahashi | 396/86 |
| 5,161,026 A | * | 11/1992 | Mabuchi et al. | 348/335 |
| 5,194,956 A | * | 3/1993 | Iwamoto | 348/347 |
| 5,420,632 A | * | 5/1995 | Yamagiwa | 348/240 |
| 5,485,208 A | * | 1/1996 | Mabuchi et al. | 348/335 |
| 5,608,457 A | * | 3/1997 | Tohyama et al. | 348/335 |
| 5,648,836 A | * | 7/1997 | Sato et al. | 348/345 |
| 5,701,157 A | * | 12/1997 | Kato et al. | 348/240 |
| 5,812,189 A | * | 9/1998 | Kimura et al. | 348/240 |
| 5,867,217 A | * | 2/1999 | Okino et al. | 348/358 |
| 6,204,880 B1 | * | 3/2001 | Nishimura | 348/240 |

* cited by examiner

Primary Examiner—Wendy R. Garber
Assistant Examiner—Aung S. Moe
(74) Attorney, Agent, or Firm—Robin, Blecker & Daley

(57) ABSTRACT

In an interchangeable-lens type camera to which a lens unit is removably secured, information relative to the amount of variation per unit time of the focal length of the magnification varying lens of the lens unit is transmitted from the lens unit to a camera-body side, and zoom control is performed on the camera-body side on the basis of such information.

15 Claims, 21 Drawing Sheets

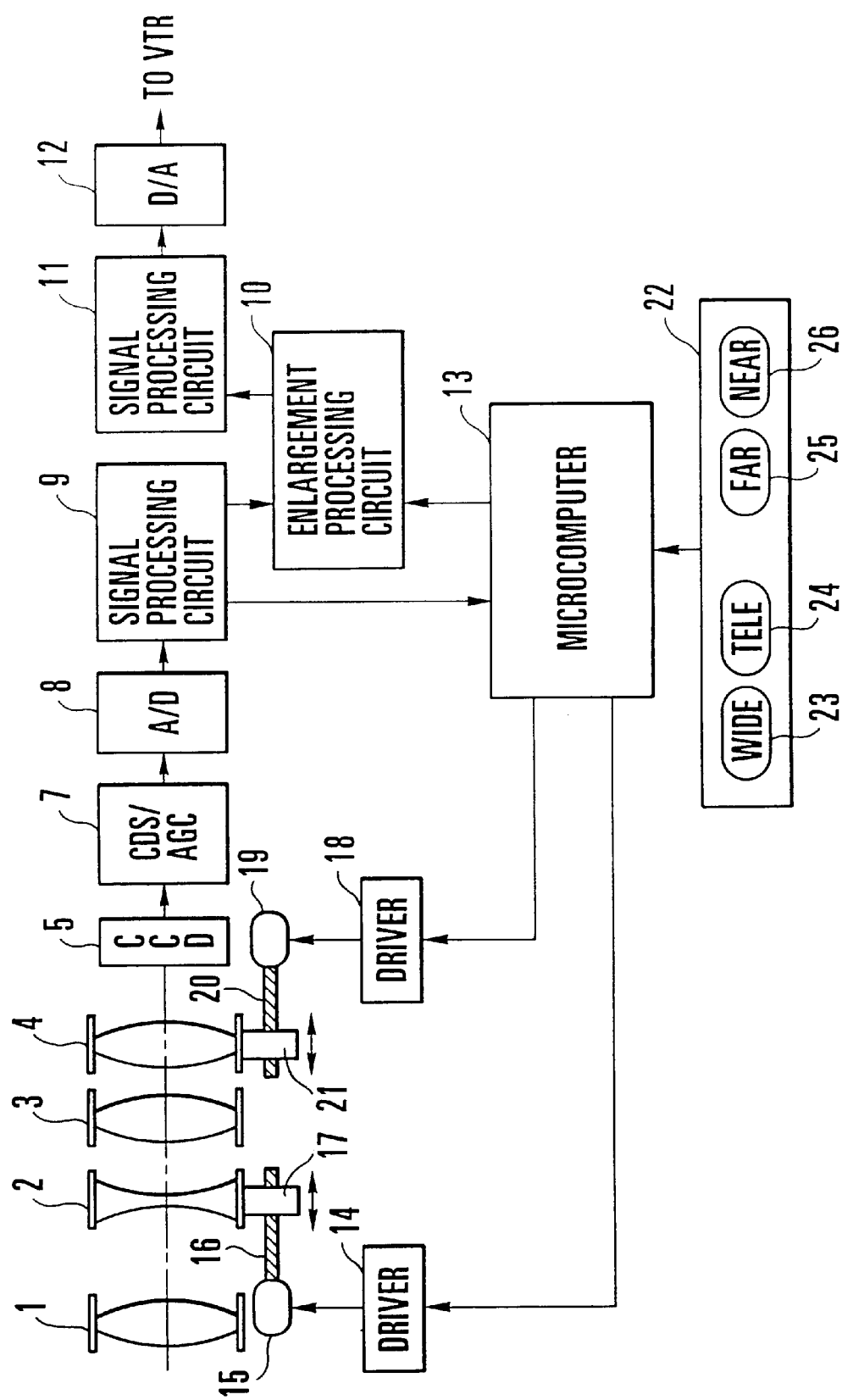

FIG. 13(a)   FIG. 13(b)
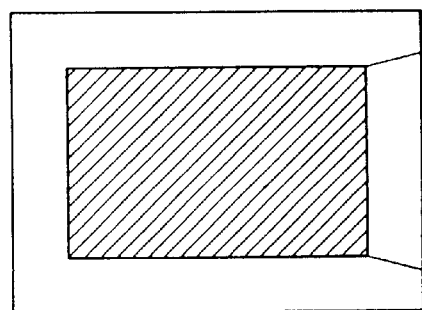
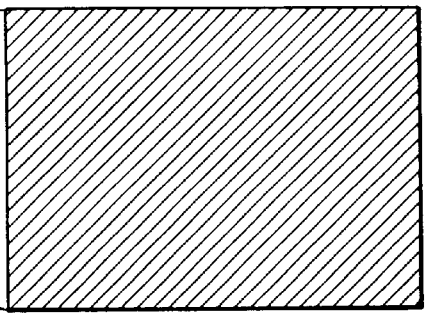
FIG. 13(c)   FIG. 13(d)
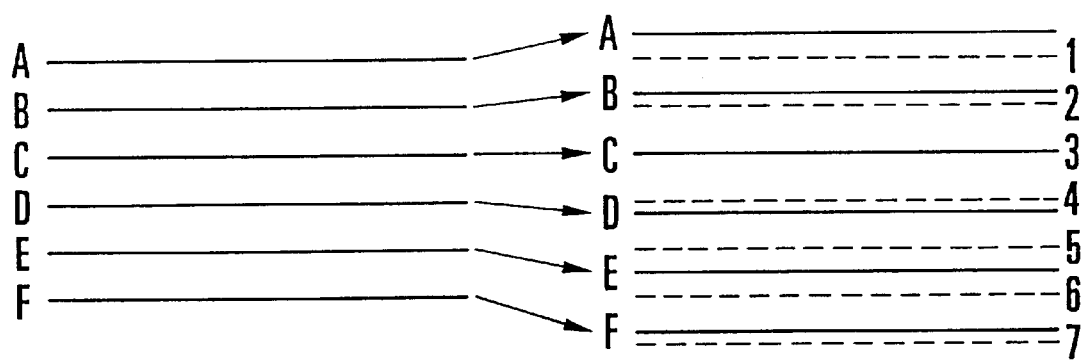

$LR1 = (x - 3a/2, y - b/2)$
$CR1 = (x - a/2, y - b/2)$
$RR1 = (x + a/2, y - b/2)$
$IR1 = (x + 3a/2, y + b/2)$

IMAGE PICKUP APPARATUS HAVING ELECTRONIC ZOOM FUNCTION BASED ON OPTICAL ZOOMING FOCAL LENGTH VARIATION WITH TIME

BACKGROUND OF THE INVENTION

1. Field of the Invention

The present invention relates to a camera to which a lens unit is removably secured.

2. Description of the Related Art

In recent years, video apparatuses, such as video cameras, have made remarkable advances, and more development effort has been directed to realizing video apparatuses having more functions and higher performance.

In such a situation, to increase the number of functions to be incorporated into a video camera, a high-magnification zoom lens has been employed as optical zoom, and an electronic-zoom function for enlarging a picked-up image by electronic image processing through signal processing on a camera-body side has been realized as electronic zoom.

By combining the optical zoom and the electronic zoom, it is possible to obtain a magnification equivalent to the product of the magnification of the optical zoom and that of the electronic zoom, so that it is possible to realize a zooming operation of higher magnification.

In addition, as one method of realizing more functions and higher image quality, it has been proposed to use an interchangeable lens system as a lens system for a video camera, so that it has been become possible to realize a video camera capable of coping with any photographic condition. In the interchangeable lens system, the combination of the optical zoom and the electronic zoom makes it possible to select lenses so that the main characteristics of the respective lenses can be utilized as effectively as possible. Such combination is, therefore, extremely effective in coping with more photographic conditions.

In the above-described combination of the optical zoom and the electronic zoom, in general, zooming is performed by using the optical zoom which does not cause a degradation in image quality, within the range of magnifications which can normally be covered by the optical zoom, and after the optical zoom reaches its telephoto end, the optical zoom is switched to the electronic zoom so that an image is electronically enlarged.

However, when the optical zoom reaches the telephoto end and is switched to the electronic zoom, if the magnification variation rate of the image differs between the optical zoom and the electronic zoom, the magnification variation rate of the image changes sharply, so that the image may undergo an unnatural and abrupt change.

As is known, in an integrated-type video camera in which its lens unit and its camera body are inseparably fixed to each other, even if the magnification variation rate differs between the optical zoom and the electronic zoom, the magnification variation rate changes in one particular manner at all times. In contrast, in an interchangeable-lens type video camera in which its lens unit is interchangeably secured to its camera body and plural kinds of lens units can be combined with the camera body, the plural kinds of lens units normally are respectively provided with different magnification varying lenses each having not only a different moving speed but also a magnification variation rate of a different variation pattern. Such an interchangeable-lens type video camera has the disadvantage that the transition from the optical zoom to the electronic zoom (or vice versa) is not smoothly performed and, in addition, the manner of such transition differs among the kinds of lens units used.

SUMMARY OF THE INVENTION

It is, therefore, a first object of the present invention to provide a camera system for an interchangeable-lens type camera, which is capable of executing smooth control whatever kind of lens unit is secured to a camera body.

A second object of the present invention is to provide an image pickup apparatus, a lens unit and a camera each of which is capable of effecting a smooth transition between optical zoom and electronic zoom without causing an unnatural or abrupt change in an image, as well as an interchangeable lens system in which whatever kind of lens unit is secured to a camera body, it is possible to effect a smooth transition between optical zoom and electronic zoom without causing an abrupt change in an image.

To achieve the above objects, according to one aspect of the present invention, there is provided a lens unit which is removably secured to a camera body and which comprises a magnification varying lens for performing a magnification varying operation, communication means for communicating data with the camera body, and control means for transmitting information relative to an amount of variation per unit time of a focal length of the magnification varying lens to the camera body via the communication means.

According to another aspect of the present invention, there is provided a lens unit in which the communication means is arranged to transmit to the camera body the information relative to the amount of variation per unit time of the focal length of the magnification varying lens and information relative to a position of the magnification varying lens.

According to another aspect of the present invention, there is provided a lens unit in which information indicating whether the magnification varying lens is located at its telephoto end is transmitted as the information relative to the position of the magnification varying lens.

According to another aspect of the present invention, there is provided a lens unit in which the magnification varying lens is capable of operating at a plurality of speeds, and the information relative to the amount of variation per unit time of the focal length of the magnification varying lens includes a plurality of pieces of information which respectively correspond to the plurality of speeds of the magnification varying lens.

According to another aspect of the present invention, there is provided a camera to which a lens unit is removably secured and which comprises image pickup means, electronic-zoom means for electrically varying a magnification of an image signal outputted from the image pickup means, communication means for receiving from the lens unit information relative to an amount of variation per unit time of a focal length of a magnification varying lens, and control means for controlling a magnification variation rate of the electronic-zoom means on the basis of the information.

According to another aspect of the present invention, there is provided a camera in which the control means controls the magnification variation rate of the electronic-zoom means on the basis of the information relative to the amount of variation per unit time of the focal length of the magnification varying lens and the information relative to the position of the magnification varying lens.

According to another aspect of the present invention, there is provided a camera in which the information relative to the position of the magnification varying lens is information indicating whether the magnification varying lens is located at its telephoto end.

According to another aspect of the present invention, there is provided a camera in which the magnification varying lens is capable of operating at a plurality of speeds, and the information relative to the amount of variation per unit time of the focal length of the magnification varying lens includes a plurality of pieces of information which respectively correspond to the plurality of speeds of the magnification varying lens.

According to another aspect of the present invention, there is provided a camera which comprises a magnification varying lens for performing a magnification varying operation, image pickup means, electronic-zoom means for electrically varying a magnification of an image signal outputted from the image pickup means, and control means for controlling a magnification variation rate of the electronic-zoom means on the basis of information relative to an amount of variation per unit time of a focal length of the magnification varying lens.

According to another aspect of the present invention, there is provided a camera in which the control means controls the magnification variation rate of the electronic-zoom means on the basis of the information relative to the amount of variation per unit time of the focal length of the magnification varying lens and information relative to a position of the magnification varying lens.

According to another aspect of the present invention, there is provided a camera in which the information relative to the position of the magnification varying lens is information indicating whether the magnification varying lens is located at its telephoto end.

According to another aspect of the present invention, there is provided a camera in which the magnification varying lens is capable of operating at a plurality of speeds, and the information relative to the amount of variation per unit time of the focal length of the magnification varying lens includes a plurality of pieces of information which respectively correspond to the plurality of speeds of the magnification varying lens.

According to another aspect of the present invention, there is provided an image pickup apparatus which comprises a lens unit including a magnification varying lens capable of varying its focal length at a plurality of speeds, a camera body to which the lens unit is secured and which includes an image pickup element and a signal processing circuit, selection means for selecting either one of a first communication mode for mainly communicating information peculiar to the lens unit and a second communication mode for mainly communicating information indicative of control and a state of the lens unit, and control means provided in the a camera body and arranged to obtain, if the first communication mode is selected, information relative to amounts of variations per unit time of a focal length of the magnification varying lens of the lens unit which respectively correspond to the plurality of speeds of the magnification varying lens.

According to another aspect of the present invention, there is provided an image pickup apparatus in which the control means is arranged to obtain information relative to a position of the magnification varying lens if the second communication mode is selected.

According to another aspect of the present invention, there is provided an image pickup apparatus in which the information relative to the position of the magnification varying lens is information indicating whether the magnification varying lens is located at its telephoto end.

Another object of the present invention is to provide an interchangeable-lens type camera having improved AF performance, particularly an interchangeable-lens type camera which is capable of achieving optimum AF performance at all times irrespective of the kind of lens unit used.

Another object of the present invention is to improve the AF characteristics of an automatic focus adjusting operation to be carried out during execution of an optical-zoom operation and an electronic-zoom operation.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 12 is a block diagram showing the entire arrangement of a video camera using the inner focus type of lens unit;

FIGS. 13(a) to 13(d) are views showing the principle of enlargement and aiding in describing an electronic-zoom operation;

DETAILED DESCRIPTION OF THE PREFERRED EMBODIMENTS

Preferred embodiments of the present invention will be described below with reference to the accompanying drawings.

First of all, a combination of optical zoom and electronic zoom will be described below.

Figure 9:
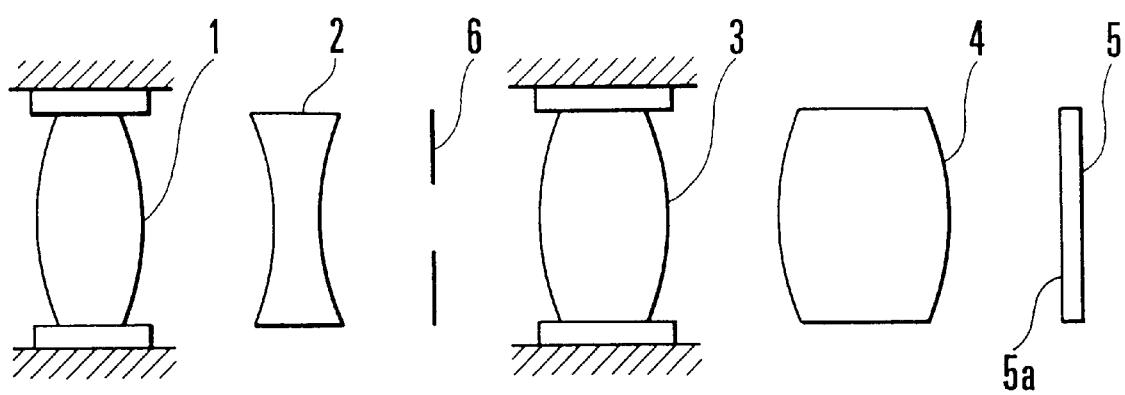
FIG. 9 is a schematic diagram showing an inner focus type of lens arrangement.

FIG. 9 shows a basic arrangement of an inner focus type of lens system which has recently been widely used because its entire size can be reduced. The arrangement shown in FIG. 9 includes a fixed first lens group 1, a second lens group (hereinafter referred to as the magnification varying lens) 2 for performing a magnification varying operation, a fixed third lens group 3, a fourth lens group (hereinafter referred to as the compensation lens) 4 which has both a focus adjusting function and a so-called compensation function for compensating for a movement of a focal plane due to the magnification varying operation, an image pickup element 5, an image pickup surface 5a of the image pickup element 5, and an iris 6 for adjusting the amount of light passing therethrough.

In the lens system which is arranged as shown in FIG. 9, the compensation lens 4 has both the compensation function and the focus adjusting function, so that even if the focal length of the magnification varying lens 2 is equal, the position of the compensation lens 4 at which a subject image can be focused on the image pickup surface 5a will vary according to the subject distance.

Figure 10:
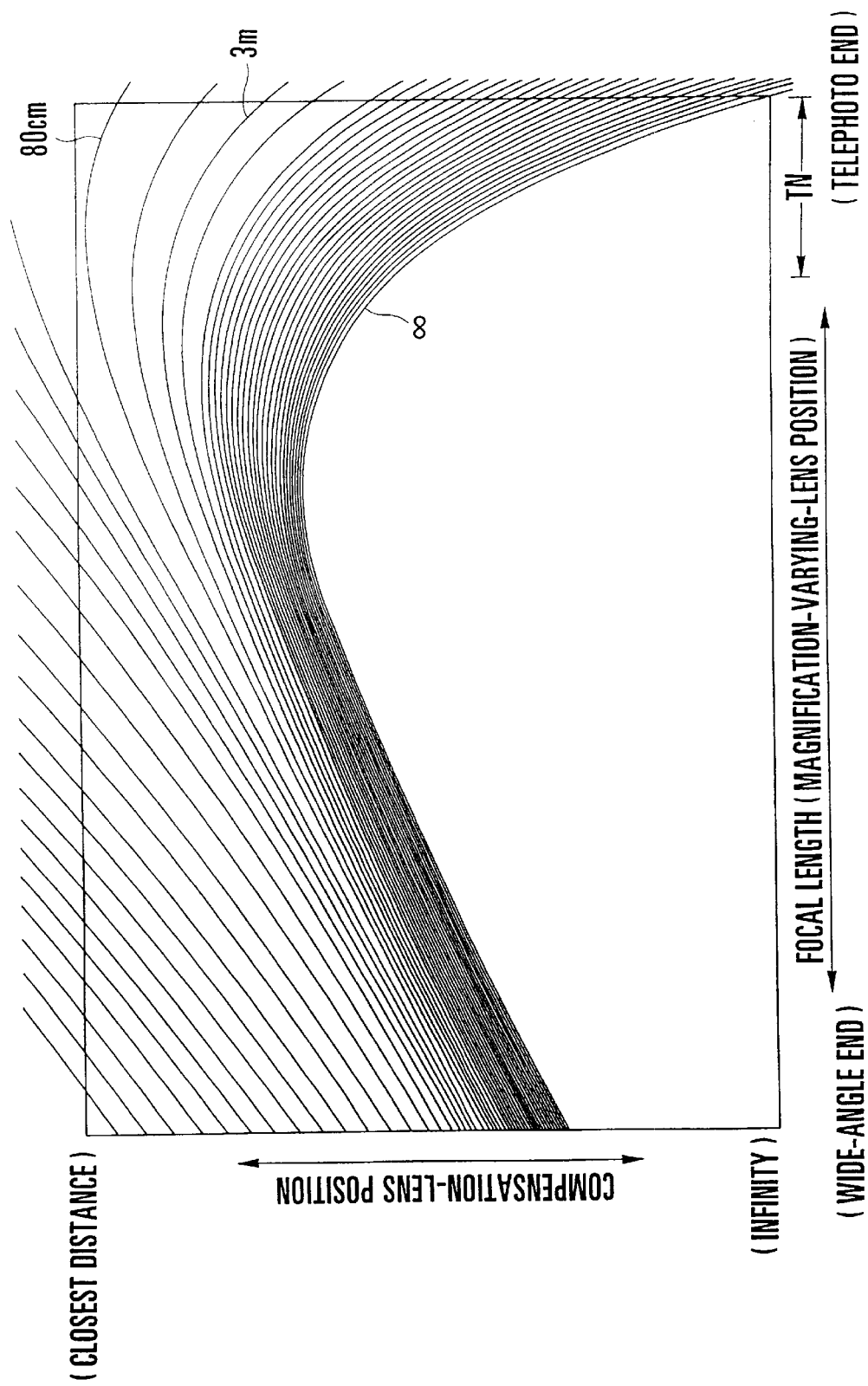
FIG. 10 is a characteristic diagram of a magnification varying lens and a compensation lens in the inner focus type of lens unit.

If the position of compensation lens 4 at which a subject image can be focused on the image pickup surface 5a is continuously plotted while the subject distance is being varied with respect to each focal length of the magnification varying lens 2, the loci shown in FIG. 10 are obtained. In FIG. 10, the horizontal axis represents the position of the magnification varying lens 2 (focal length), and the vertical axis represents the position of the compensation lens 4 (subject distance).

As can be seen from FIG. 10, a magnification varying operation which causes no defocusing can be achieved by selecting a specific locus from among the shown loci according to the subject distance and moving the compensation lens 4 along the selected locus.

As is known, a so-called front-lens focus type of lens system, which is arranged to perform adjustment of focus by driving a front lens, includes a magnification varying lens and a compensation lens independently of each other, and the magnification varying lens and the compensation lens are arranged to operate in interlocking relation to each other through a mechanical cam ring.

Accordingly, no matter how fast a user moves a manual zoom knob which is provided on the cam ring, to manually vary the focal length, the cam ring rotates following the movement of the knob, and the magnification varying lens and the compensation lens move along the corresponding cam slots formed in the cam ring, so that as long as the focusing lens (compensation lens) is in focus, such an operation causes no defocusing.

In general, in the control of the inner focus type of lens system having the aforesaid feature, since a mechanical interlocking mechanism is difficult to employ, a group of information indicative of the plurality of loci shown in FIG. 10 is stored in a lens controlling microcomputer in an appropriate form in advance. In zooming, a specific locus is selected on the basis of the position of the compensation lens and that of the magnification varying lens and the compensation lens is made to move along the selected locus.

Further, since the position of the compensation lens relative to the position of the magnification varying lens is read from a memory element and applied to lens control, it is necessary to read the positions of the respective lenses with substantially high accuracy.

As is apparent from FIG. 10, while the magnification varying lens is moving at an equal or approximately equal speed, the inclination of each locus of the compensation lens continues to vary with the variation of the focal length at all times. This indicates that the moving speed and direction of the compensation lens continue to vary at all times, and an actuator for the compensation lens is required to have a highly precise speed response performance over the range of 1 Hz to several hundred Hz.

It is becoming general to employ a stepping motor for a compensation lens group in the inner focus type of lens system as an actuator which meets such requirement.

The stepping motor is arranged to rotate in complete synchronism with step pulses outputted from the lens controlling microcomputer or the like, and has a constant stepping angle per pulse. The use of the stepping motor, therefore, provides high speed response performance, high stopping accuracy and high positioning accuracy.

In addition, since the rotating angle of the stepping motor is constant per step pulse, the number of step pulses themselves can be employed as incremental encoder information. Accordingly, the stepping motor also has the advantage that no special position encoder may be added.

As described previously, if a magnification varying operation is to be performed by using such a stepping motor while an in-focus state is being maintained, it is necessary to store the locus information shown in FIG. 10 in the lens controlling microcomputer or the like in advance in an appropriate form (for example, in the form of the loci themselves or a function employing the positions of the respective lenses as variables), read specific locus information according to the position or the moving speed of the magnification varying lens, and move the compensation lens (focusing lens) on the basis of the read locus information.

Figure 11:
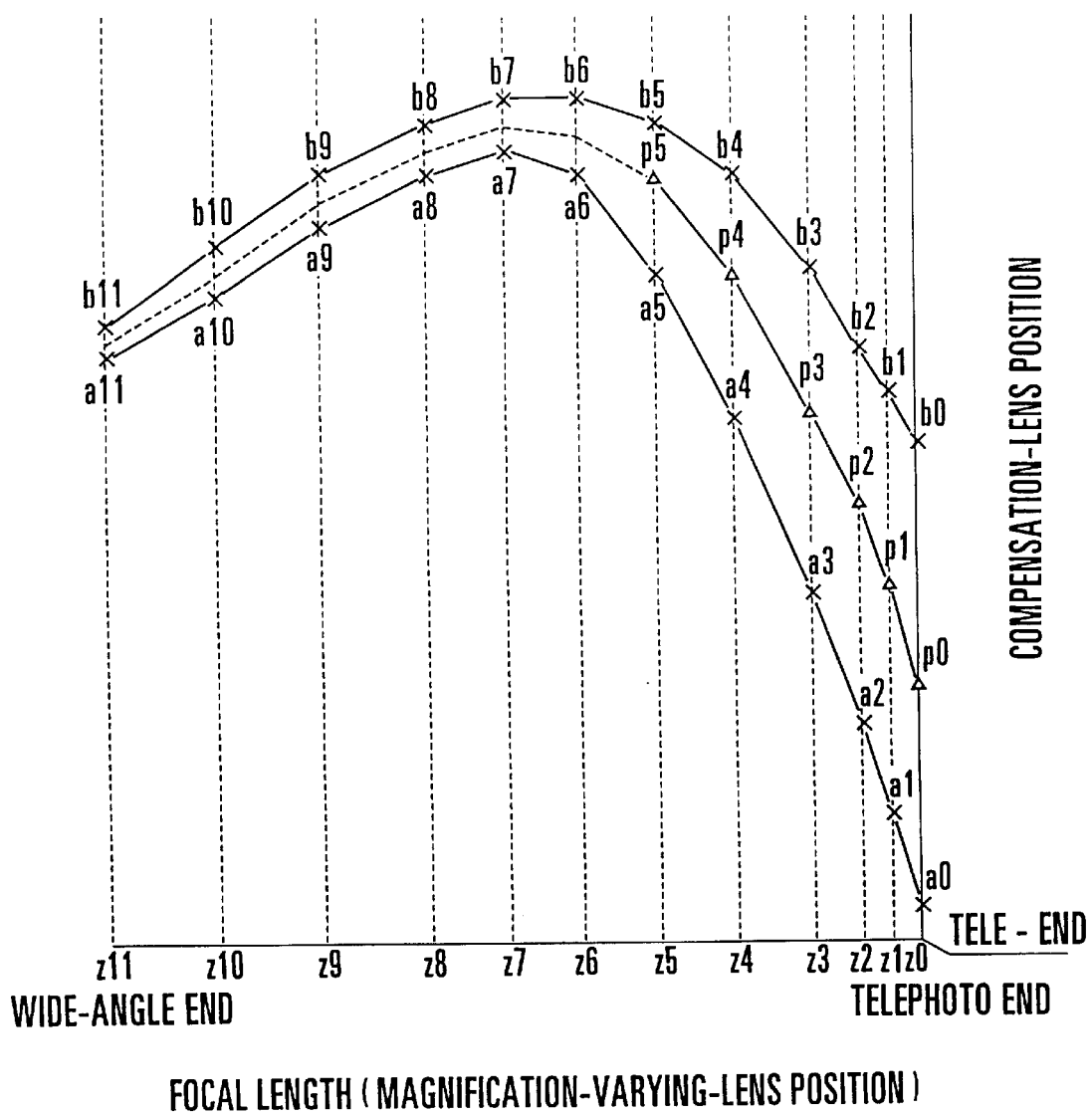
FIG. 11 is a focal-length versus compensation-lens-position characteristic diagram of the inner focus type of lens unit.

FIG. 11 is a view aiding in explaining one example of a proposed locus tracking method.

In FIG. 11, points z0, z1, z2, . . . , z11 indicate individual positions taken by the magnification varying lens, and two groups of points a0, a1, a2, . . . , a11 and points b0, b1, b2, . . . , b11 respectively indicate representative loci stored in the lens controlling microcomputer.

The points p0, p1, p2, . . . , p11 indicate the locus calculated from the two representative loci. An expression for calculating this locus is noted below:

$$p(n+1)=|p(n)-a(n)|/|b(n)-a(n)|*|b(n+1)-a(n+1)|+a(n+1) \quad (1)$$

According to Expression (1), if the focusing lens is located at, for example, the point p0 in FIG. 11, the ratio at which the point p0 internally divides the line segment b0-a0 is found and a point to internally divide the line segment b1-a1 in accordance with the found ratio is determined as the point p1. Letting Vz be the moving speed of the magnification varying lens and letting Tz be the period of time required for the magnification varying lens to move from the point z0 to the point z1, $$Tz=(z1-z0) \div Vz. \quad$$

From the positional difference between the points p1 and p0 as well as the above expression, the moving speed, Vf, of the focusing lens which is required to maintain an in-focus state is obtained. In general, the moving speed Vf is given by:

$$Vf=(p(n+1)-p(n))*Vz \div (z(n-1)-z(n)) \quad (2)$$

During the magnification varying operation, if the focusing lens is made to move at the moving speed Vf given by Expression (2), the focusing lens can trace the cam locus while maintaining its in-focus state.

If the moving speed of the magnification varying lens is made faster for the purpose of high-speed zooming or the like, the moving speed of the focusing lens which is required to maintain its in-focus state becomes larger in the vicinity of a telephoto end, and may exceed the maximum controllable rotational speed of a motor for driving the focusing lens. At this time, the focusing lens becomes unable to maintain the in-focus state and a greatly defocused state occurs.

One proposal which has been made to solve the above problem is a method of preventing the moving speed of the focusing lens from exceeding the maximum controllable rotational speed, by reducing the moving speed of the magnification varying lens in the vicinity of the telephoto end. The method of reducing the moving speed of the magnification varying lens differs depending on the kind of actuator to be used for lens driving.

In general, a DC motor is used, and servo control is needed for implementing speed reduction control using the DC motor.

In contrast, if a stepping motor is used, a speed reduction method which will be described below can be adopted.

If the moving speed calculated from Expression (2) is not less than the maximum controllable rotational speed Vfmax, Expression (2) is modified in the following manner:

$$Vz=Vfmax*(z(n+1)-z(n)) \div (p(n+1)-p(n)) \quad (3)$$

and the magnification varying lens and the focusing lens are respectively made to move at the moving speed Vz and the speed Vfmax so that the in-focus state is maintained.

In this speed reduction method, the speed reduction pattern of the magnification varying operation varies for different subject distances.

Specifically, as can be seen from the inclinations of the cam loci shown in FIG. 10, the value of p(p+1)−p(n) of Expression (3) differs for different subject distances with respect to the same magnification-varying-lens position. Accordingly, the moving speed Vz at which zooming is performed when an in-focus subject lies at a location closer to infinity becomes smaller than the moving speed Vz at which the magnification varying lens starts to reduce its moving speed on a side closer to a wide-angle end and reaches the telephoto end.

However, in the above-described speed reduction method for the magnification varying lens, the moving speed at which the magnification varying lens reaches the telephoto end differs for different subject distances, so that the smoothness of the transition from the optical zoom to the electronic-zoom operation of electronically varying the magnification of an image is impaired, resulting in unnatural zooming.

One measure taken against the above problem will be described below.

FIG. 12 is a block diagram showing the feature of an example of such measure. The following description assumes that stepping motors are used as actuators for the magnification varying lens and the compensation lens, respectively.

The arrangement shown in FIG. 12 includes an inner focus type of lens system which is composed of the fixed front (first) lens group 1, the magnification varying second lens group 2, the fixed third lens group 3, and the fourth lens group 4 which has the compensation function and the focusing (focus adjusting) function (the iris 6 shown in FIG. 9 is omitted for the sake of simplicity).

The arrangement shown in FIG. 12 also includes the image pickup element 5, a known correlated double sampling (CDS) and automatic gain control (AGC) circuit 7, an A/D converter 8, a digital signal processing circuit 9, an enlargement processing circuit 10, a digital signal processing circuit 11, and a D/A converter 12.

The arrangement shown in FIG. 12 also includes a microcomputer 13 for performing enlargement processing as well as driving control on the lens system, a motor driver 14 for the magnification varying lens 2, a motor driver 18 for the compensation lens 4, a stepping motor 15 for driving the magnification varying lens 2, a stepping motor 19 for driving the compensation lens 4, an output shaft 16 directly connected to the stepping motor 15, an output shaft 20 directly connected to the stepping motor 19, a rack 17 fixed to the magnification varying lens 2 and engaged with the output shaft 16, and a rack 21 fixed to the compensation lens 4 and engaged with the output shaft 20. As the output shafts 16 and 20 rotate, the racks 17 and 21 move in parallel with the optical axis of the lens system and the respective lens groups fixed to the moving rack 17 and 21 move.

A switch group 22 for operating the lens system includes switches 23 and 24 for causing the magnification varying lens 2 to selectively move toward its wide-angle end and its telephoto end, and switches 25 and 26 for causing the compensation (focusing) lens 4 to selectively move toward its infinity position and its closest-distance position.

The flow of a video signal will be described below.

Light from a subject passes through the aforesaid lens groups 1, 2, 3 and 4 is focused onto the image pickup surface of the image pickup element 5. The focused light is converted into an electrical signal by the image pickup element 5, and the electrical signal is outputted from the image pickup element 5.

The electrical signal outputted from the image pickup element 5 is supplied to the A/D converter 8 through the correlated double sampling and AGC circuit 7, and is converted into a digital signal by the A/D converter 8.

The digital signal formed by the A/D converter 8 is subjected to predetermined signal processing, such as separation into a luminance signal component and a chrominance signal component, gamma correction and blanking processing, in the digital signal processing circuit 9, and is converted into a standardized television signal. The luminance signal and the chrominance signal are supplied to the enlargement processing circuit 10, in which enlargement processing is electronically performed on both signals.

The enlargement processing circuit 10 is provided with, for example, a memory for storing the luminance signal and the color-difference signals outputted from the digital signal processing circuit 9, by an amount equivalent to at least one picture. The enlargement processing circuit 10 produces an enlarged image, as by thinning out the pixels or scanning lines of the memory to vary an image reading area of the memory, reading an image from the image reading area, and interpolating information between the thinned-out pixels or scanning lines. The detail of this enlargement processing will be described later.

The digital luminance and color-difference signals which have been subjected to the enlargement processing by the enlargement processing circuit 10 are supplied to the digital signal processing circuit 11, in which those signals are converted into a color signal by an encoder. The color signal is converted into an analog signal by the D/A converter 12, and the analog signal is outputted to a VTR, a monitor or the like.

The manner in which each of the motors 15 and 19 is driven will be described below.

The microcomputer 13 determines speeds at which to respectively drive the zooming motor 15 and the focusing motor 19, through program processing, and sends the respective speeds to the motor driver 14 for the driving the zooming motor 15 and to the motor driver 18 for driving the focusing motor 19, as rotational-frequency signals for the respective stepping motors 15 and 19.

In the meantime, information signals indicative of directions in which to rotate the respective motors 15 and 19 are sent to the corresponding motor drivers 14 and 18. Such rotating-direction signals are determined in the following manner. The rotating-direction signal for the zooming motor 15 is determined according to the states of the two zoom switches 23 and 24, whereas the rotating-direction signal for the focusing motor 19 is determined according to the states of the two switches 25 and 26 if manual focusing is selected, or according to a driving-direction instruction determined in an AF (automatic focusing) processing routine executed in the microcomputer 13, if AF is selected.

Each of the motor drivers 14 and 18 sets four motor excitation phases to a forward- and reverse-rotation phase according to the driving-direction signal for the corresponding one of the motors 15 and 19, and also varies and outputs four motor excitation phase voltages (currents) for application to the corresponding one of the motors 15 and 19, according to the received rotational-frequency signal. Thus, each of the motor drivers 14 and 18 controls the direction and the frequency of rotation of the corresponding one of the motors 15 and 19.

The enlargement processing performed by the enlargement processing circuit 10 will be described below.

The enlargement processing is performed in the following manner. When a photographer manipulates the telephoto zoom switch 24, this manipulation input is provided to the microcomputer 13 and the microcomputer 13 first performs optical zoom. If the optical zoom reaches its optical telephoto end, the microcomputer 13 causes the enlargement processing circuit 10 to perform the enlargement processing (electronic zoom).

One example of image enlargement processing using linear interpolation will be described below with reference to FIGS. 13(a) to 13(d).

If the hatched portion shown in FIG. 13(a) is to be displayed in the enlarged state shown in FIG. 13(b), the relationship between the scanning lines of the original image (FIG. 13(a)) and those of the enlarged image (FIG. 13(b)) is represented as shown in FIGS. 13(c) and 13(d).

To convert the enlarged image (FIG. 13(b)) into a standard television signal, scanning lines [1] to [7], shown by dashed lines in FIG. 13(d), need to be produced from scanning lines [A] to [F], shown by solid lines in FIG. 13(d).

At this time, the dashed-line scanning lines can be obtained by multiplying the respective solid-line scanning lines by weights according to the distances between the dashed- and solid-line scanning lines and adding the obtained products together. By performing this linear interpolation processing in the vertical and horizontal directions of the original image, the original image can be enlarged at an arbitrary enlargement rate.

Figure 14:
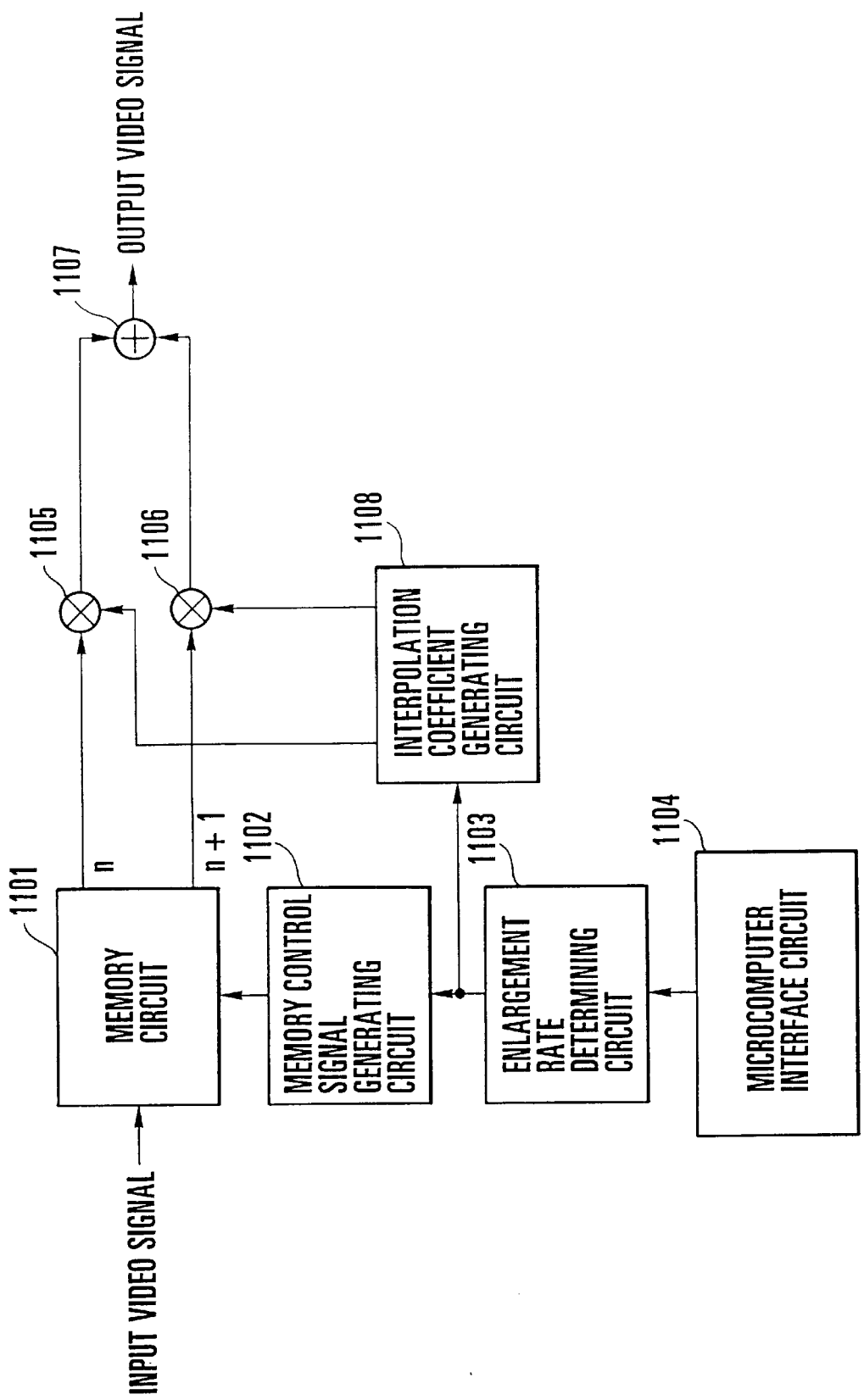
FIG. 14 is a block diagram showing a circuit arrangement for performing enlargement processing by electronic zoom.

FIG. 14 is a block diagram aiding in explaining one example of the enlargement processing circuit 10. As shown, the enlargement processing circuit 10 includes a memory circuit 1101 in which to store an input video signal and which is arranged to output a signal on a scanning line [n] specified by a memory reading control signal and a signal on a scanning line [n-1] which is delayed by a 1H period, a memory control signal generating circuit 1102 for controlling the writing and reading operations of the memory circuit 1101, an enlargement rate determining circuit 1103 for determining an enlargement rate and an enlargement position, an interpolation coefficient generating circuit 1104 for generating an interpolation coefficient according to the enlargement rate determined by the enlargement rate determining circuit 1103, multipliers 1105 and 1106, an adder 1107, and a microcomputer interface circuit 1108 for receiving enlargement rate information and enlargement position information from the microcomputer 13.

In operation, the signal on the scanning line [n] and the signal on the scanning line [n-1] are read from the memory circuit 1101 in which the input video signal is stored, in accordance with the memory reading control signal. Simultaneously, the interpolation coefficient generating circuit 1103 outputs an interpolation coefficient according to the distance between a signal to be interpolated and the signal on the scanning line [n] and an interpolation coefficient according to the distance between the signal to be interpolated and the signal on the scanning line [n-1]. The respective interpolation coefficients are multiplied by the signal on the line [n] and the signal on the line [n-1] in the multipliers 1105 and 1106. When the results of both multiplications are added together in the adder 1107, a linear interpolation signal can be obtained.

Figure 15:
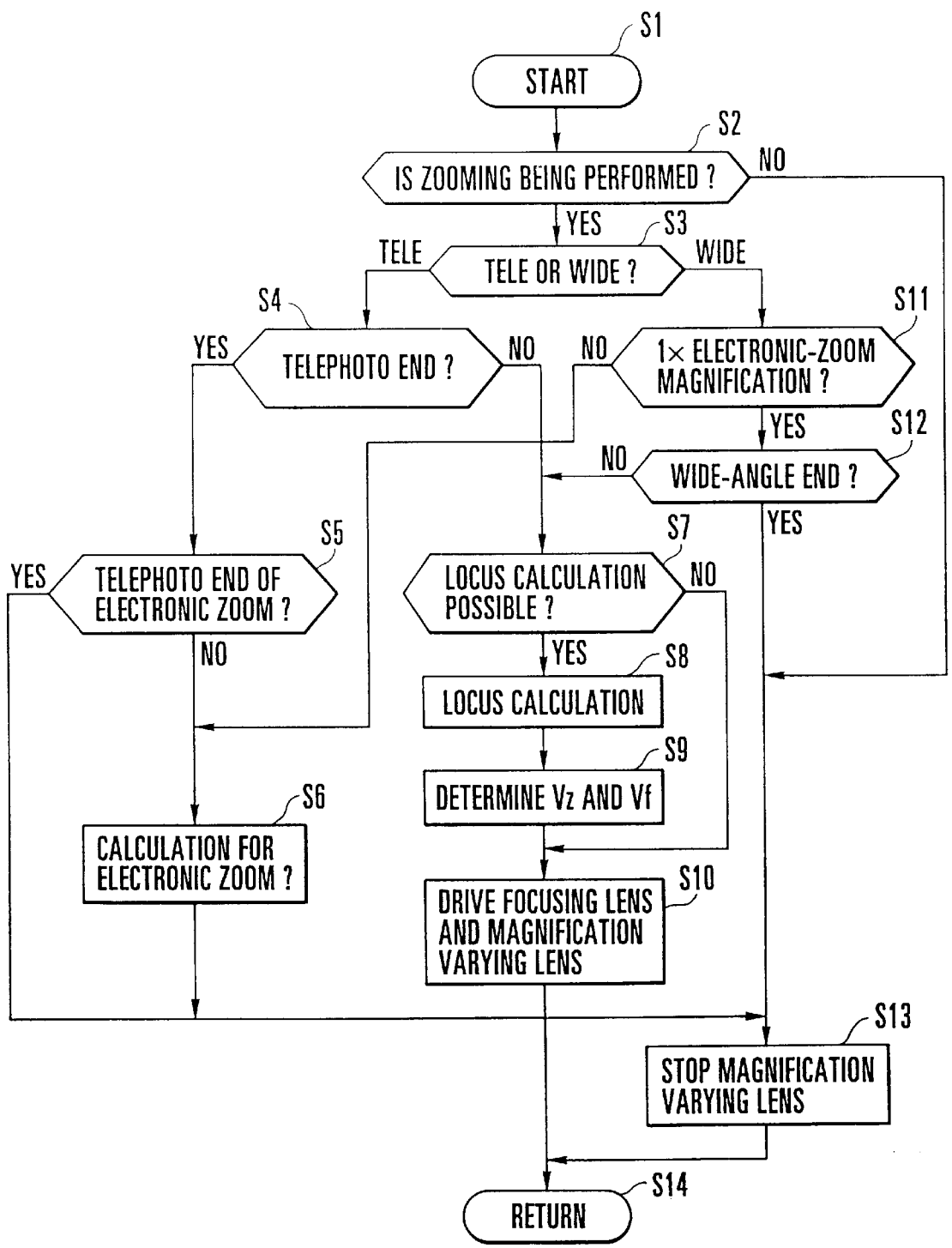
FIG. 15 a flowchart aiding in describing the zooming operation of the video camera shown in FIG. 1.

FIG. 15 is a control flowchart aiding in explaining a zooming operation which constitutes part of the operation of the microcomputer 13. This control flowchart will be described with reference to manual zoom by way of example.

Step S1 indicates the start of this flowchart. In Step S2, it is determined whether a zooming operation is being performed. If neither the wide-angle zoom switch 23 nor the telephoto zoom switch 24 of the switch group 22 is pressed or both of them are pressed, it is determined that a zooming operation is not being performed, and the process proceeds to Step S13, in which the magnification varying lens is brought to a stop.

If it is determined in Step S2 that either one of the zoom switches 23 and 24 is pressed, the process proceeds to Step S3, in which zooming processing is performed.

In Step S3, it is determined which of the telephoto zoom switch 24 and the wide-angle zoom switch 23 is pressed. If the telephoto zoom switch 24 is pressed, the process proceeds to Step S4, whereas if the wide-angle zoom switch 23 is pressed, the process proceeds to step S11.

In Step S4, it is determined whether the magnification varying lens is located at the telephoto end. If the magnification varying lens is located at the telephoto end, the process proceeds to Step S5; otherwise, the process proceeds to Step S7.

In Step S5, it is determined whether the electronic zoom has reached its telephoto end. If the electronic zoom has reached the telephoto end, the process proceeds to Step S13; otherwise, the process proceeds to Step S6.

In Step S6, an enlargement coefficient is increased or decreased according to which of the telephoto zoom switch 24 and the wide-angle zoom switch 23 is pressed, and a computation is performed on the electronic zoom. The microcomputer 13 drives the enlargement processing circuit 10 on the basis of the result of the computation, and causes the process to proceed to Step S13.

On the other hand, if it is, determined in Step S3 that the wide-angle zoom switch 23 is pressed, the process proceeds to Step S11, in which it is determined whether the electronic zoom is being performed. If the electronic zoom is being performed (the magnification of the electronic zoom is greater than 1×), the process proceeds to Step S6, in which the aforesaid enlargement coefficient for the electronic zoom is determined and an electronic-zoom operation is performed. If it is determined in Step S11 that the electronic zoom is inoperative (the magnification of the electronic zoom is 1× and the electronic zoom is not operating), the process proceeds to Step S12.

In Step S12, it is determined whether the magnification varying lens is located at the wide-angle end. If the magnification varying lens is located at the wide-angle end, the process proceeds to Step S13, whereas if the magnification varying lens has not yet reached the wide-angle end, the process proceeds to Step S7.

In Step S7, if it is determined whether the current position of the magnification varying lens is a magnification-varying-lens position having any of the representative locus data stored in the microcomputer 13 (such magnification-varying-lens position is hereinafter called the boundary position). If the current position of the magnification varying lens does not lie on a boundary position z(n), it is determined that no locus calculation can be performed, and the process proceeds to Step S10, in which the previously calculated direction and speed of movement of each of the magnification varying lens and the focusing lens are held.

On the other hand, if it is determined that the current position of the magnification varying lens lies on the boundary position z(n), the process proceeds to Step S8, in which a tracking focusing-lens position p(n+1) at an adjacent boundary is calculated from Expression (1).

In Step S9, the moving speed Vz of the magnification varying lens is calculated. In this step, the moving speed Vz is set to a value obtained by reading, as a parameter, a magnification-varying-lens position from a zoom speed table stored in the microcomputer 13.

For the sake of saving ROM capacity, the zoom speed table contains only information relative to magnification-varying-lens positions at which a reduction in the moving speed of the magnification varying lens is needed, for example, speed information relative to the speed at which the magnification varying lens moves in an area TN (shown in FIG. 10) near to the telephoto end in which the moving speed of the compensation lens becomes larger. The individual data of the zoom speed table are values which are obtained through simulations so as to satisfy the following conditions (1), (2) and (3), and constitute a unique speed reduction pattern (the pattern of movement of the magnification varying lens toward the wide-angle end is an acceleration pattern).

(1) Even if zooming toward a subject lying at any distance is performed, the moving speed Vf of the focusing lens which is calculated in Step S9 must not exceed the maximum controllable rotational frequency of the focusing-lens driving motor.

(2) The moving speed of the magnification varying lens during zooming must be reduced smoothly.

(3) One zooming operation must be completed in as short a time as possible.

By this speed reduction operation of the magnification varying lens, it is possible to reduce the moving speed of the magnification varying lens according to the magnification variation rate of the electronic zoom so that occurrence of a sharp change in the magnification variation rate is prevented so as not to cause an abrupt change in an image being photographed during the transition from the optical zoom to the electronic zoom.

Further, in Step S9, the moving speed Vf of the focusing lens is calculated from Expression (2) by employing the tracking focusing-lens position p(n+1) and the moving speed Vz of the magnification varying lens, and the process proceeds to Step S10.

In Step S10, the focusing lens and the magnification varying lens are driven. If Vf is positive, a direction in which to move the focusing lens during zooming is a closest-distance direction, whereas if Vf is negative, such direction is an infinity direction. If Vf=0, the focusing lens is brought to a stop.

In Step S13, the magnification varying lens is brought to a stop, and the process proceeds to Step S14.

In Step S14, this flowchart is brought to an end, and the process returns to normal operation processing such as AF processing.

In this manner, by setting the moving speed of the magnification varying lens in accordance with a peculiar variation pattern, it is possible to realize not only a smooth transition from the optical zoom to the electronic zoom or vice versa, but also smooth zooming capable of consistently maintaining an in-focus state.

The aforesaid example is useful for a camera system in which a lens unit is inseparably fixed to a camera body. However, in a camera system in which an interchangeable lens unit is separably secured to a camera body and there are some combinations between plural kinds of lens units and the camera body, the variation patterns of the moving speeds of the respective magnification varying lens of the plural kinds of lens units usually differ among such individual kinds, so that the transition from the optical zoom to the electronic zoom (or vice versa) is not smoothly performed and an unnatural image magnification variation is caused. For this reason, in such a camera system in which a lens unit is removably secured to a camera body, a new measure needs to be taken.

According to embodiments of the present invention which will be described below, information relative to the variation rate of the focal length of a zooming lens can be obtained on a camera-body side, and on the basis of this information relative to such variation rate, control is performed so that a smooth transition from the optical zoom to the electronic zoom or vice versa can be effected even if a lens unit having any characteristics is secured to the camera body.

<First Embodiment>

Figure 1:
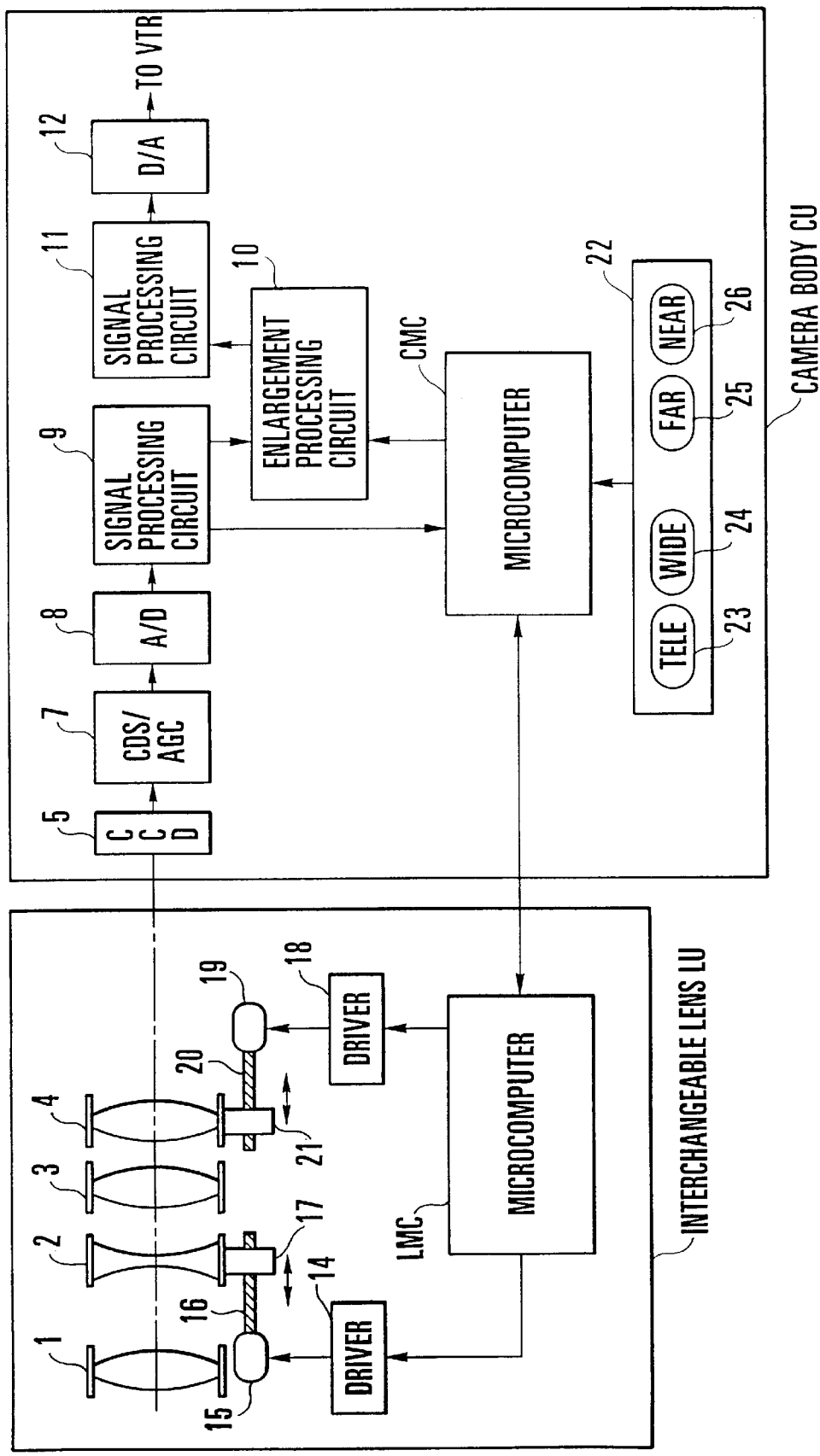
FIG. 1 is a block diagram aiding in describing the entire arrangement of a first embodiment of the present invention.

FIG. 1 is a block diagram showing the feature of an interchangeable-lens type video camera according to a first embodiment of the present invention. The shown video camera includes an interchangeable lens unit LU, a microcomputer (hereinafter referred to as the lens microcomputer) LMC built in the interchangeable lens unit LU, a camera body CU, a microcomputer (hereinafter referred to as the camera microcomputer CMC built in the camera body CU. In FIG. 1, identical reference numerals are used to denote constituent elements identical to those shown in FIG. 12, and the description thereof is omitted for the sake of simplicity.

The interchangeable lens unit LU is removably secured to the camera body CU. When the interchangeable lens unit LU is secured to the camera body CU, the interchangeable lens unit LU is supplied with electrical power from a power source (not shown) of the camera body CU, and the lens groups 1, 2, 3 and 4 are optically coupled to the image pickup element 5, while the lens microcomputer LMC and the camera microcomputer CMC are electrically coupled to each other to form bidirectional information transmitting means.

Figure 2:
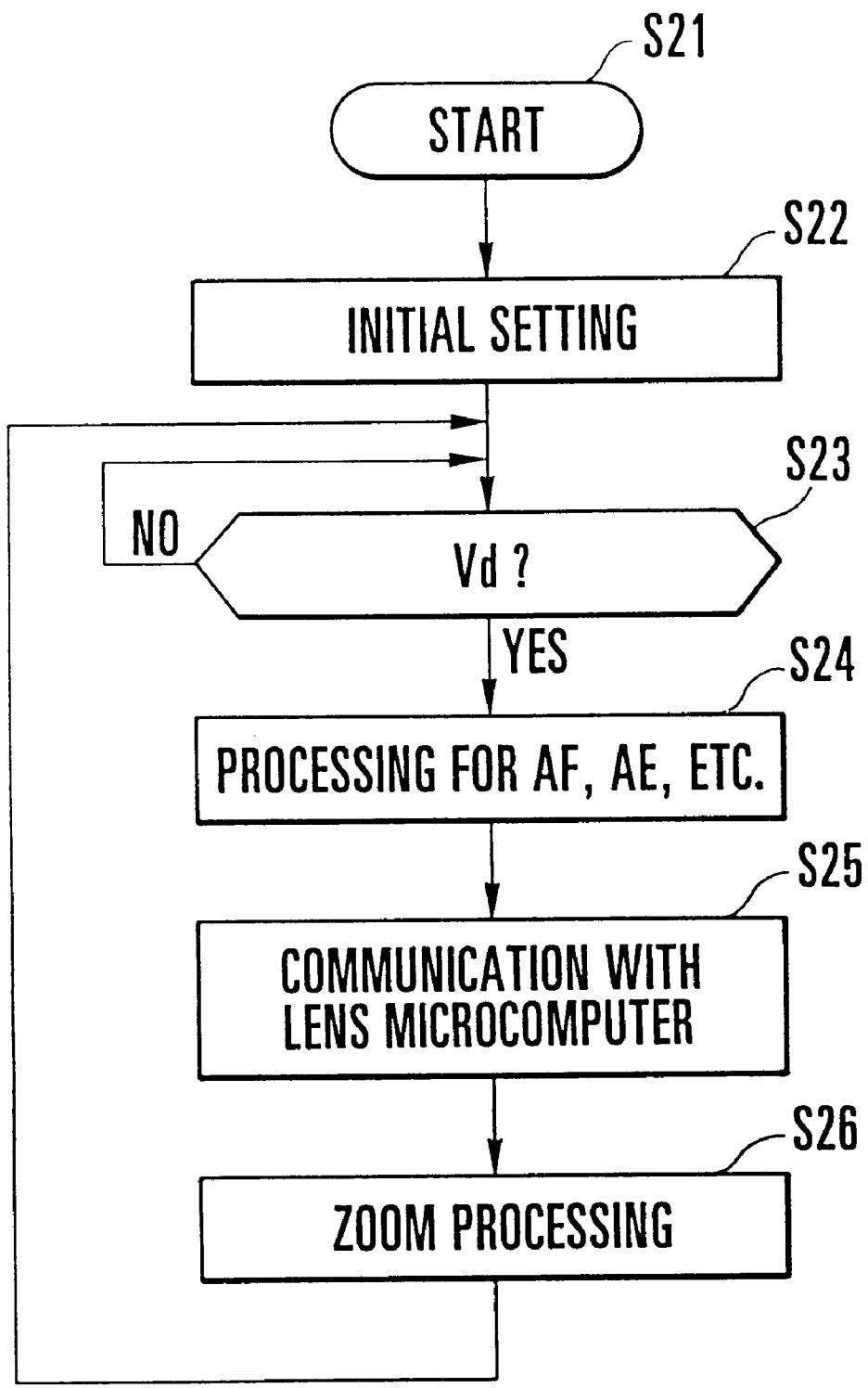
FIG. 2 is a flowchart aiding in describing the operation of a video camera according to the first embodiment of the present invention.

FIG. 2 is a view showing the outline of the flowchart of the entire processing to be performed in the camera microcomputer CMC.

The process is started in Step S21, and after predetermined initial setting is performed in Step S22, the process enters a main loop. In Step S23, the camera microcomputer CMC waits for a vertical synchronizing signal (Vd), and if the camera microcomputer CMC receives the vertical synchronizing signal, the process proceeds to Step S24.

In Step S24, processing for AE, AF and the like is performed, and the process proceeds to Step S25. In Step S25, the camera microcomputer CMC performs communication with the lens microcomputer LMC, and the process proceeds to Step S26.

In Step S26, processing for the optical zoom or the electronic zoom is performed according to the zoom switches 23 and 24. Then, the process returns to Step S23, in which the camera microcomputer CMC waits for the next vertical synchronizing signal, and the above-described processing is repeated at intervals of the period of the vertical synchronizing signal.

The processing of Step S25 of FIG. 2 will be described in more detail with reference to FIG. 3.

Figure 3:
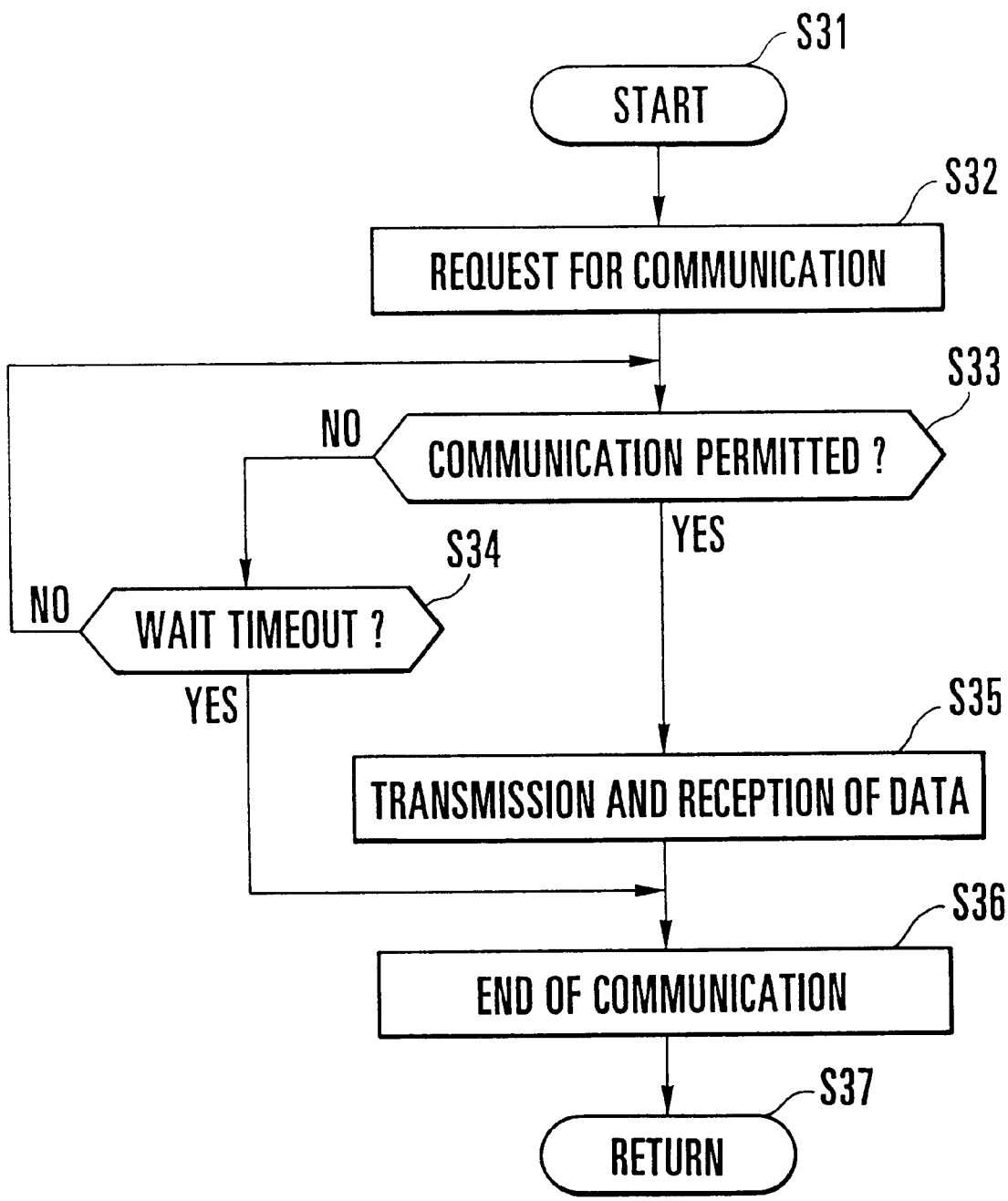
FIG. 3 is a flowchart aiding in describing the content of the processing of Step S25 of the flowchart shown in FIG. 2.

FIG. 3 is a flowchart showing the detail of the processing of Step S25 of the flowchart shown in FIG. 2, which is executed by the camera microcomputer CMC.

In the flowchart shown in FIG. 3, Step S31 indicates the start of this flowchart. In Step S32, the camera microcomputer CMC outputs a communication request signal to the lens microcomputer LMC, and the process proceeds to Step S33.

In Step S33, the camera microcomputer CMC determines whether a communication permission signal has been outputted from the lens microcomputer IMC to the camera microcomputer CMC. If the communication permission signal has not yet been outputted, the process proceeds to Step S34, whereas if the communication permission signal has been outputted, the process proceeds to Step S35.

In Step S34, the camera microcomputer CMC determines whether a wait time elapses before the communication permission signal is outputted. If the elapsed wait time does not exceed a predetermined time, the process returns to Step S33, in which the camera microcomputer CMC waits for the arrival of the communication permission signal. If it is determined in Step S34 that the elapsed wait time exceeds the predetermined time, the camera microcomputer CMC determines that a difficulty has occurred or an uncontrollable lens is secured to the camera body CU as the lens unit LU. The camera microcomputer CMC abandons communication with the interchangeable lens unit LU, and the process proceeds to Step S36.

In Step S35, various communications, such as initial communication and data communication, are bidirectionally performed between the camera microcomputer CMC and the lens microcomputer LMC in accordance with a predetermined communication format.

The data transmitted from the camera microcomputer CMC to the lens microcomputer LMC contains information based on the result of the zoom processing of Step S26. This information indicates whether to stop the magnification varying lens or a direction in which to move the magnification varying lens.

The data transmitted from the lens microcomputer LMC to the camera microcomputer CMC contains information relative to a focal-length variation rate per unit time peculiar to the magnification varying lens within an area near to the telephoto end (for example, as viewed in FIG. 10, the focal-length variation rate per unit time of the magnification varying lens for each subject distance within the area TN near to the telephoto end in which the loci exhibit sharp inclinations: such information is stored as a table in a ROM within the lens microcomputer LMC). The data transmitted also contains information indicating whether the magnification varying lens is located at the telephoto end.

In Step S36, the processing of bringing the communication to an end is executed. In Step S37, the processing of this flowchart is brought to an end and the process returns to the processing of Step S26 of the flowchart shown in FIG. 2.

The detail of the zoom processing of Step S26 of the flowchart shown in FIG. 2 will be described below in more detail with reference to FIG. 4.

Figure 4:
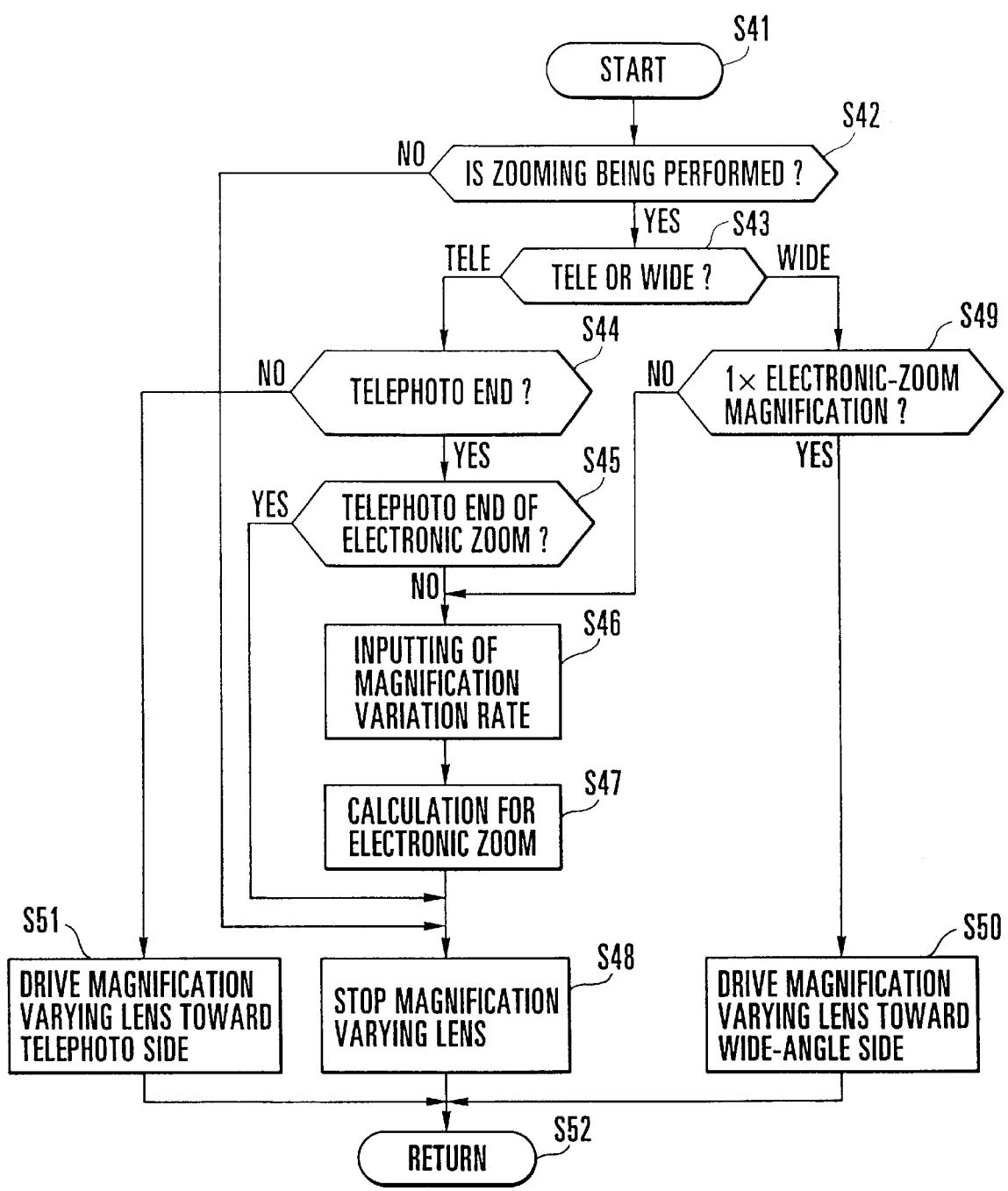
FIG. 4 is a flowchart aiding in describing the content of the processing of Step S26 of the flowchart shown in FIG. 2.

In the flowchart shown in FIG. 4, Step S41 indicates the start of this flowchart. In Step S42, it is determined whether a zooming operation is being performed. If neither the wide-angle zoom switch 23 nor the telephoto zoom switch 24 of the switch group 22 is pressed or both of them are pressed, it is determined that a zooming operation is not being performed, and the process proceeds to Step S48, in which the magnification varying lens is brought to a stop. In Step S52, the process returns to Step S23 of the flowchart of FIG. 2.

If it is determined in Step S42 that either one of the zoom switches 23 and 24 is pressed, the process proceeds to Step S43.

In Step S43, it is determined which of the telephoto zoom switch 24 and the wide-angle zoom switch 23 is pressed. If the telephoto zoom switch 24 is pressed, the process proceeds to Step S44, whereas if the wide-angle zoom switch 23 is pressed, the process proceeds to Step S49.

In Step S44, it is determined whether the magnification varying lens is located at the telephoto end. If the magnification varying lens is located at the telephoto end, the process proceeds to Step S45; otherwise, the process proceeds to Step S51.

In Step S45, it is determined whether the electronic zoom has reached its telephoto end. If the electronic zoom has reached the telephoto end, the process proceeds to Step S48; otherwise, the process proceeds to Step S46.

If it is determined in Step S45 that the electronic zoom has reached the telephoto end, since no further enlargement zooming operation can be performed, the process proceeds to Step S48, in which the magnification varying lens is held in a stopped state.

If it is determined in Step S45 that the electronic zoom has not yet reached the telephoto end, the process proceeds to Step S46, in which control of the electronic-zoom operation is performed.

Specifically, in Step S46, the camera microcomputer CMC receives the information relative to the focal-length variation rate per unit time of the magnification varying lens 2 in the area TN near to the telephoto end of the interchangeable lens unit LU, which rate has been obtained through the processing of Step S25 of the flowchart of FIG. 2. Then, the process proceeds to Step S47, in which a calculation is performed on the enlargement rate of the electronic zoom.

In Step S47, the enlargement coefficient is increased or decreased according to which of the telephoto zoom switch 24 and the wide-angle zoom switch 23 is pressed, and a computation is performed on the electronic zoom on the basis of the information relative to the focal-length variation rate per unit time of the magnification varying lens in the area near to the telephoto end. The camera microcomputer CMC drives the enlargement processing circuit 10 on the basis of the result of the computation, and causes the process to proceed to Step S48.

In other words, the camera microcomputer CMC detects the magnification variation rate of the magnification varying lens in the area near to the telephoto end, and sets the enlargement rate of the electronic zoom so that when the magnification varying lens reaches the telephoto end and the optical zoom is switched to the electronic zoom, the magnification variation rate is prevented from sharply varying to cause an unnatural change in an image.

Accordingly, the enlargement rate of the electronic zoom can be controlled irrespective of the characteristics of a lens unit secured to the camera body, on the basis of information, supplied from the lens unit, which is relative to the magnification variation rate of its magnification varying lens in an area near to the telephoto end of the magnification varying lens. Accordingly, it is possible to effect a natural transition from the enlargement rate of the magnification varying lens to that of the electronic zoom.

On the other hand, if it is determined in Step S49 whether the electronic zoom is being performed. If the electronic zoom is being performed, the process proceeds to the processing of Step S46; otherwise, the process proceeds to the processing of Step S50.

If it is determined in Step S49 that the electronic zoom is not being performed (the magnification of the electronic zoom is 1×), the process proceeds to the processing of Step S50 since it has been determined in Step S43 that the wide-angle zooming switch 23 has been manipulated. In Step S50, in order to drive the magnification varying lens toward its wide-angle side, a request to move the magnification varying lens toward the wide-angle side is set in information to be sent from the camera microcomputer CMC to the lens microcomputer LMC. The process proceeds to Step S52, in which it returns to the main program shown in FIG. 2.

On the other hand, if it is determined in Step S49 that the magnification of the electronic zoom is not 1× and the electronic-zoom operation is being performed, the process proceeds to Step S46. In Step S46, as described above, the electronic-zoom operation is performed at an enlargement rate which allows for the magnification variation rate of the magnification varying lens in the area near to the telephoto end, so that the electronic-zoom operation is effected without causing an abrupt change in the transition from the zooming operation due to the magnification varying lens to the electronic-zoom operation.

In Step S48, a request to stop the magnification varying lens is added to the information to be sent from the camera microcomputer CMC to the lens microcomputer LMC. Then, the process proceeds to Step S52.

In Step S51, since it has been determined that the telephoto zooming switch 24 has been manipulated and the magnification varying lens has not yet reached the telephoto end, a request to move the magnification varying lens toward its telephoto side is set in the information to be sent from the camera microcomputer CMC to the lens microcomputer LMC. Then, the process proceeds to Step S52, brings the processing of this flowchart to an end, and returns to Step S23 of the flowchart shown in FIG. 2.

Figure 5:
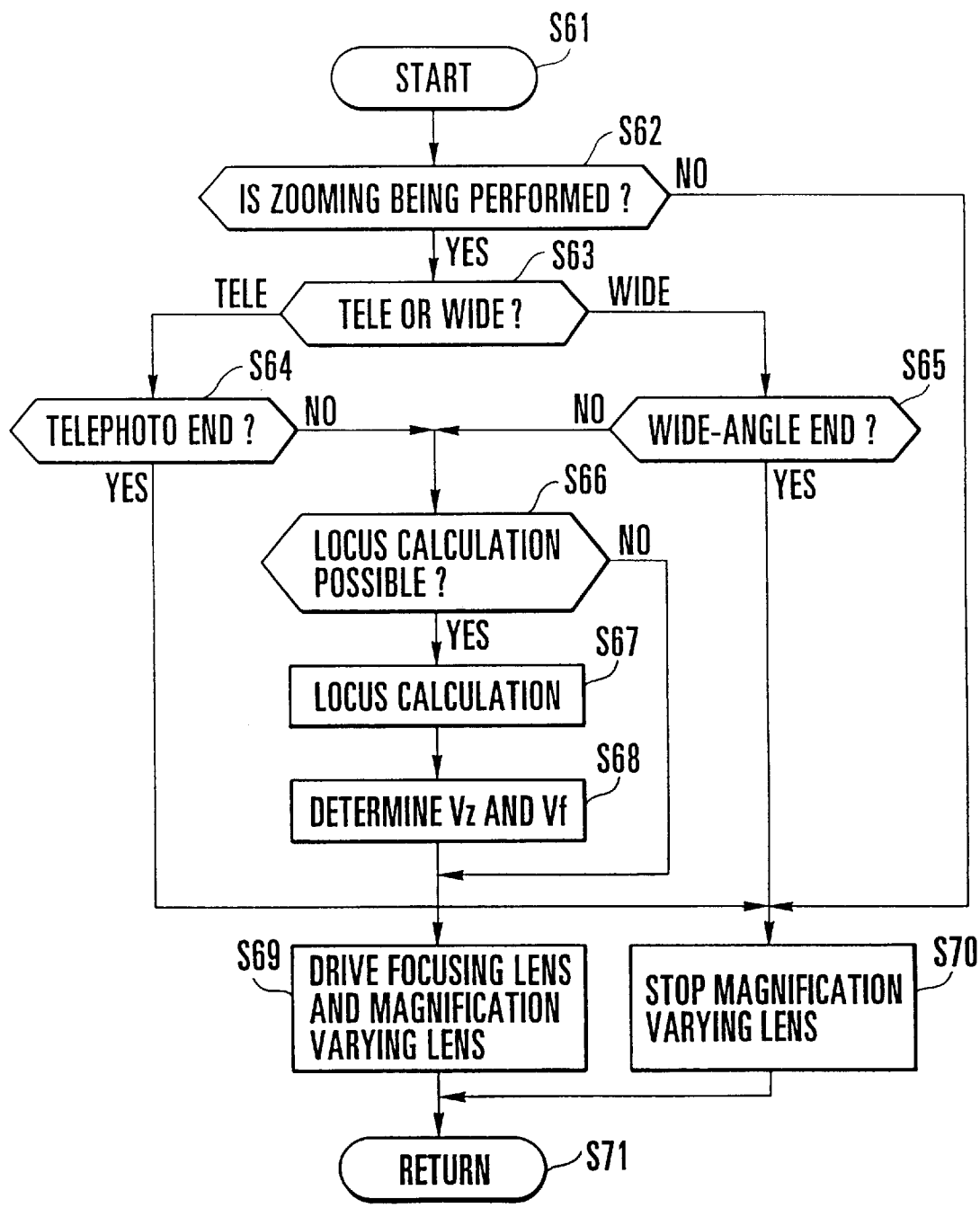
FIG. 5 is a flowchart aiding in describing processing which is performed in a lens microcomputer in the first embodiment of the present invention.

FIG. 5 is a control flowchart aiding in explaining a zooming operation which constitutes part of the operation of the lens microcomputer LMC. This control flowchart will be described with reference to manual zoom by way of example.

Step S61 indicates the start of the processing of this flowchart. In Step S62, it is determined whether the information which the lens microcomputer LMC has received from the camera microcomputer CMC through data communication contains a request to stop the magnification varying lens. If such request is contained, the process proceeds to Step S70, in which the processing of bringing the magnification varying lens to a stop is performed. If such request is not contained, the process proceeds to Step S63.

In Step S63, it is determined whether a direction in which to move the magnification varying lens is a telephoto direction or a wide-angle direction. If the information received from the camera microcomputer CMC indicates the telephoto direction, the process proceeds to Step S64, whereas if the information received indicates the wide-angle direction, the process proceeds to Step S65.

In Step S64, it is determined whether the magnification varying lens is located at the telephoto end. If the magnification varying lens is located at the telephoto end, the process proceeds to Step S70, in which the processing of bringing the magnification varying lens to a stop is performed. If the magnification varying lens is not located at the telephoto end, the process proceeds to Step S66.

In Step S65, it is determined whether the magnification varying lens is located at the wide-angle end. If the magnification varying lens is located at the wide-angle end, the process proceeds to Step S70, in which the processing of bringing the magnification varying-lens to a stop is performed. If the magnification varying lens is not located at the telephoto end, the process proceeds to Step S66.

In Step S66, it is determined whether the current position of the magnification varying lens is a magnification-varying-lens position having any of the representative locus data stored in the lens microcomputer LMC (such magnification-varying-lens position is hereinafter called the boundary position). If the current position of the magnification varying lens does not lie on the boundary position z(n), it is determined that no locus calculation can be performed, and the process proceeds to Step S69, in which the previously calculated direction and speed of movement of each of the magnification varying lens and the focusing lens are held.

On the other hand, if it is determined in Step S66 that the current position of the magnification varying lens lies on the boundary position z(n), i.e., a locus calculation is possible, the process proceeds to Step S67, in which a tracking focusing-lens position p(n+1) at an adjacent boundary is calculated from Expression (1).

In Step S68, the moving speed Vz of the magnification varying lens is calculated. In this step, the moving speed Vz is set to a value obtained by reading, as a parameter, a magnification-varying-lens position from a zoom speed table stored in the lens microcomputer LMC. This table is obtained by a method similar to that shown in FIG. 2.

Further, in Step S68, the moving speed Vf of the compensation lens is calculated from Expression (2) by employing the tracking focusing-lens position p(n+1) and the moving speed Vz of the magnification varying lens, and the process proceeds to Step S69.

In Step S69, the compensation lens and the magnification varying lens are driven. If Vf is positive, a direction in which to move the compensation lens during zooming is a closest-distance direction, whereas if Vf is negative, such direction is an infinity direction. If Vf=0, the focusing lens is brought to a stop.

In Step S71, this flowchart is brought to an end, and the process returns to the main processing program shown in FIG. 2.

By executing the above-described processing, even if any kind of lens unit is secured to the camera body, the magnification variation rate of the magnification varying lens of the lens unit in the area near to the telephoto end is transmitted to the camera body through the communication between the lens unit and the camera body, so that the magnification variation rate of the electronic-zoom operation to be performed by image processing in the camera body can be controlled. Accordingly, it is possible to effect a smooth and natural transition from the zooming operation due to the magnification varying lens to the electronic-zoom operation without causing an unnatural change in the angle of view of an image.

<Second Embodiment>

Figure 6:
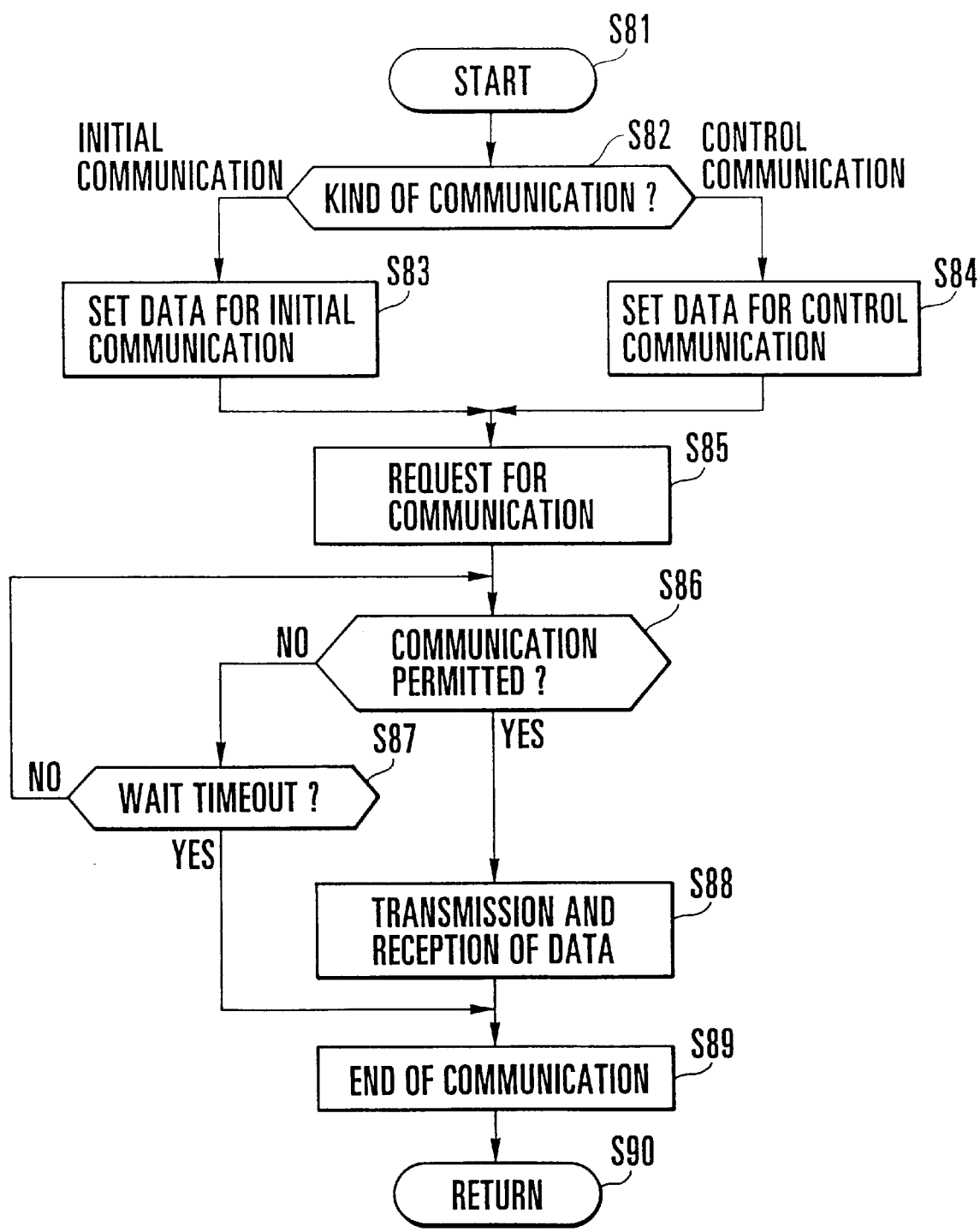
FIG. 6 is a flowchart aiding in describing communications which are performed between a lens unit and a camera body in a second embodiment of the present invention.
Figure 7:
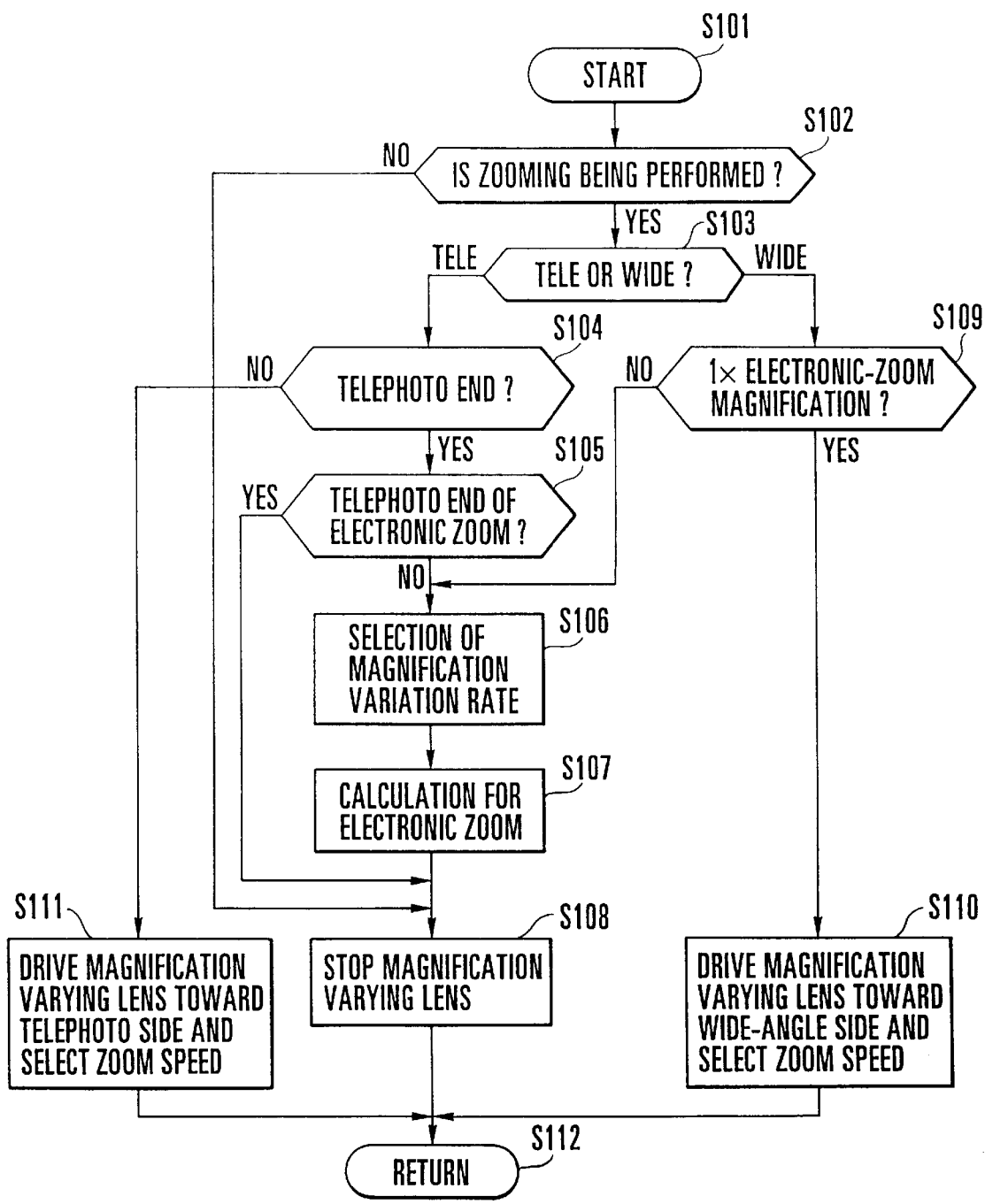
FIG. 7 is a flowchart aiding in describing a zooming operation according to the second embodiment of the present invention.
Figure 8:
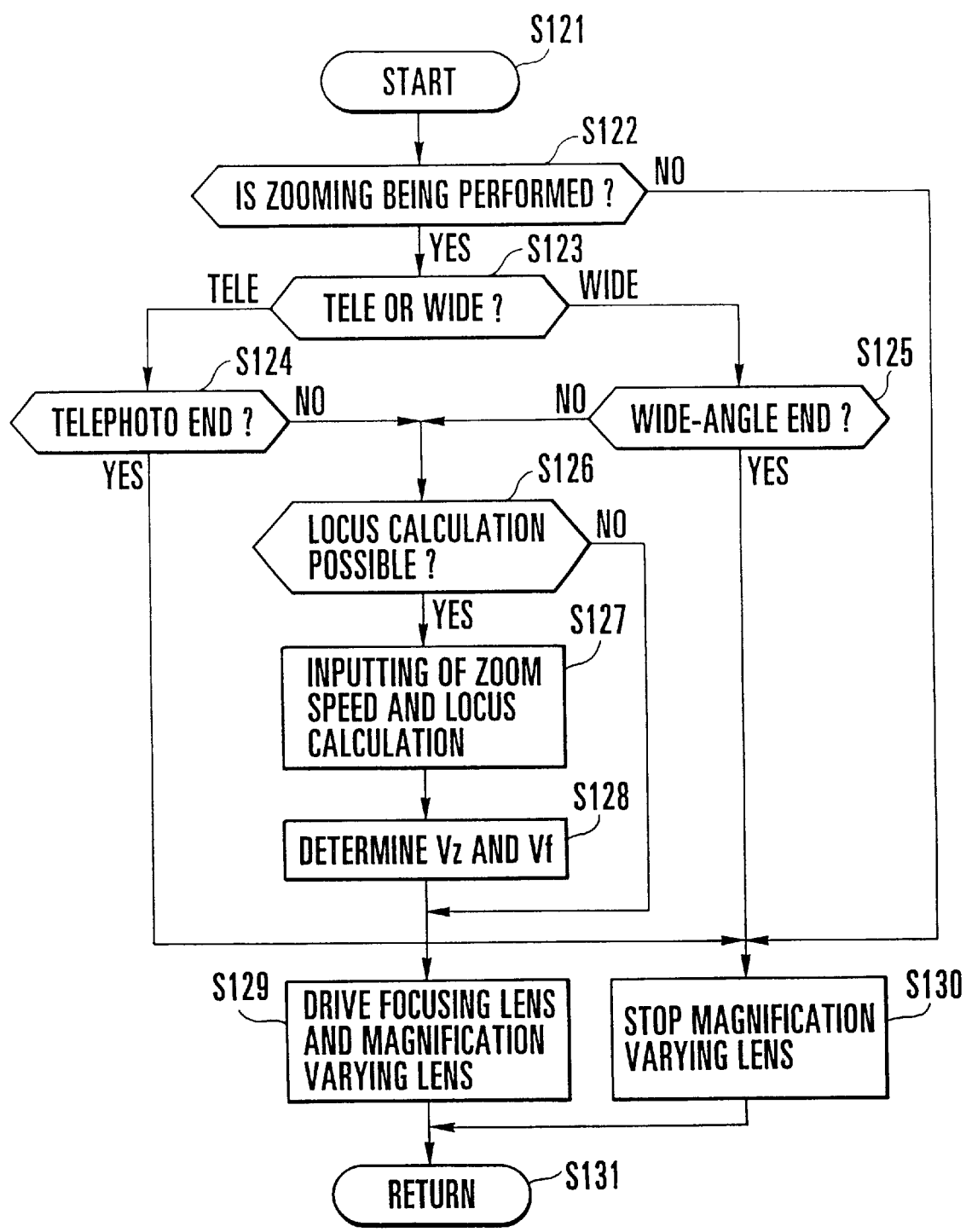
FIG. 8 is a flowchart aiding in describing processing which is performed in the lens microcomputer according to the second embodiment of the present invention.

FIGS. 6, 7 and 8 are views aiding in describing a second embodiment of the present invention.

As will be described below, in the second embodiment, each of the wide-angle zoom switch 23 and the telephoto zoom switch 24 of the switch group 22 shown in FIG. 1 employs a variable resistor or a pressure-sensitive variable resistor to constitute a so-called variable-speed zoom in which a zoom speed at which to execute zooming toward the wide-angle end or toward the telephoto end can be selected from among a plurality of zoom speeds by manipulating the zoom switch 23 or 24. If such zoom speed is variable, it is necessary to vary the electronic-zoom operation on the camera-body side according to the zoom speed.

Specifically, the processing of Step S25 of the flowchart shown in FIG. 2, which is used in the above-described first embodiment, may be modified into the processing shown in the flowchart shown in FIG. 6.

The second embodiment has an initial communication mode in which information peculiar to the interchangeable lens unit LU is mainly communicated between the lens microcomputer LMC and the camera microcomputer CMC, and a control communication mode in which information relative to control of the interchangeable lens unit LU and the state thereof is mainly communicated between the lens microcomputer LMC and the camera microcomputer CMC.

In FIG. 6, Step S81 indicates the start of this flowchart. In Step S82, either one of the two communications modes is selected. If the initial communication mode is selected, the process proceeds to Step S83, whereas if the control communication mode is selected, the process proceeds to Step S84.

A selection criterion in the processing of Step S82 may be set so that the initial communication mode is selected immediately after the power source of the camera body CU has been turned on or the interchangeable lens unit LU has been secured to the camera body CU, and when the processing of the initial communication mode is completed, the control communication mode is selected. However, other various selection criteria may be adopted.

If the process proceeds to Step S83, communication data for the initial communication mode is prepared, whereas if the process proceeds to Step S84, communication data for the control communication mode is prepared. Then, the process proceeds to Step S85 for communication request processing.

In Step S85, the camera microcomputer CMC outputs a communication request signal to the lens microcomputer LMC, and the process proceeds to Step S86.

In Step S86, the camera microcomputer CMC determines whether a communication permission signal has been outputted from the lens microcomputer LMC to the camera microcomputer CMC. If the communication permission signal has not yet been outputted, the process proceeds to Step S87, whereas if the communication permission signal has been outputted, the process proceeds to Step S88.

In Step S87, the camera microcomputer CMC determines whether a wait time elapses before the communication permission signal is outputted. If the elapsed wait time does not exceed a predetermined time, the process returns to Step S86, in which the camera microcomputer CMC waits for the arrival of the communication permission signal. If it is determined in Step S87 that the elapsed wait time exceeds the predetermined time, the camera microcomputer CMC abandons communication with the interchangeable lens unit LU, and the process proceeds to Step S89. In Step S89, the communication is brought to an end, and in Step S90 the process returns to the main program.

On the other hand, if it is determined in Step S86 that the communication permission signal has been outputted, the process proceeds to Step S88, in which a bidirectional communication is performed between the camera microcomputer CMC and the lens microcomputer LMC.

The control communication data transmitted from the camera microcomputer CMC to the lens microcomputer LMC contains information based on the result of the zoom processing of Step S26 shown in FIG. 2. This information indicates whether to stop the magnification varying (zooming) lens or a direction in which to move the magnification varying lens, as well as information indicative of a selected zoom speed.

The initial communication data transmitted from the lens microcomputer LMC to the camera microcomputer CMC contains information relative to focal-length variation rates per unit time peculiar to the magnification varying lens within the area near to the telephoto end, which focal-length variation rates respectively correspond to the plurality of zoom speeds, as well as information indicating whether the magnification varying lens is located at the telephoto end.

In Step S89, the processing of bringing the communication to an end is executed. In Step S90, the processing of this flowchart is brought to an end and the process returns to the processing of Step S26 of the flowchart shown in FIG. 2.

In the second embodiment, the processing of step S26 of the flowchart of FIG. 2 is modified, as shown in FIG. 7.

In the flowchart shown in FIG. 7, Step S101 indicates the start of this flowchart. In Step S102, it is determined whether a zooming operation is being performed. If neither the wide-angle zoom switch 23 nor the telephoto zoom switch 24 of the switch group 22 is pressed or both of them are pressed, it is determined that a zooming operation is not being performed, and the process proceeds to Step S108, in which the magnification varying lens is brought to a stop. In Step S112, the process returns to Step S23 of the flowchart of FIG. 2. If it is determined in Step S42 that either one of the zoom switches 23 and 24 is pressed, the process proceeds to Step S103.

In Step S103, it is determined which of the telephoto zoom switch 24 and the wide-angle zoom switch 23 is pressed. If the telephoto zoom switch 24 is pressed, the process proceeds to Step S104, whereas if the wide-angle zoom switch 23 is pressed, the process proceeds to Step S109.

In Step S104, it is determined whether the magnification varying lens is located at the telephoto end. If the magnification varying lens is located at the telephoto end, the process proceeds to Step S105; otherwise, the process proceeds to Step S111.

In Step S105, it is determined whether the electronic zoom has reached its telephoto end. If the electronic zoom has reached the telephoto end, the process proceeds to Step S108; otherwise, the process proceeds to Step S106.

In Step S106, the camera microcomputer CMC receives information relative to a magnification variation rate corresponding to a currently selected zoom speed, from among the information relative to the focal-length variation rates per unit time of the magnification varying lens in the area near to the telephoto end. The focal-length variation rates are obtained during the initial communication mode, as described above with reference to the flowchart of FIG. 6, and respectively correspond to the plurality of selectable zoom speeds of the interchangeable lens unit LU. Then, the process proceeds to Step S107.

In Step S107, the enlargement coefficient is increased or decreased according to which of the telephoto zoom switch 24 and the wide-angle zoom switch 23 is pressed, and a computation is performed on the electronic zoom on the basis of the information relative to the focal-length variation rate per unit time of the magnification varying lens in the area near to the telephoto end. The camera microcomputer CMC drives the enlargement processing circuit 10 on the basis of the result of the computation, and matches the enlargement rate of the electronic zoom to the enlargement rate of the magnification varying lens at the telephoto end when the zooming operation of the magnification varying lens is switched to that of the electronic zoom. Accordingly, it is possible to effect a natural transition from the enlargement rate of the magnification varying lens to that of the electronic zoom.

Then, the process proceeds to Step S108, in which a request to stop the magnification varying lens is added to the information to be sent from the camera microcomputer CMC to the lens microcomputer LMC. Then, the process returns to the processing of Step S23 shown in FIG. 2.

If the process proceeds to Step S109, it is determined in Step S109 whether the electronic zoom is being performed. If the electronic zoom is being performed (the magnification of the electronic zoom is greater than 1×), the process proceeds to the processing of Step S106, in which, as described above, the camera microcomputer CMC receives information relative to a magnification variation rate corresponding to a currently selected zoom speed, from among the information relative to the focal-length variation rates per unit time of the magnification varying lens in the area near to the telephoto end, which rates are obtained from the interchangeable lens unit LU, as described above, and respectively correspond to the plurality of selectable zoom speeds of the magnification varying lens. Then, the process proceeds to Step S107, in which the enlargement coefficient is increased or decreased according to which of the telephoto zoom switch 24 and the wide-angle zoom switch 23 is pressed, and a computation is performed on the electronic zoom on the basis of the information relative to the focal-length variation rate per unit time of the magnification varying lens in the area near to the telephoto end. The camera microcomputer CMC drives the enlargement processing circuit 10 on the basis of the result of the computation, and matches the enlargement rate of the electronic zoom to the enlargement rate of the magnification varying lens at the telephoto end when the zooming operation of the magnification varying lens is switched to that of the electronic zoom. Accordingly, it is possible to effect a smooth and natural transition from the enlargement rate of the magnification varying lens to that of the electronic zoom without causing an abrupt change in an image.

If it is determined in Step S109 that the electronic zoom is not being performed (the magnification of the electronic zoom is 1×), the process proceeds to Step S110.

In Step S110, a request to move the magnification varying lens toward the wide-angle side and information indicative of a selected zoom speed are set in the aforesaid information to be sent from the camera microcomputer CMC to the lens microcomputer LMC. The process proceeds to Step S112.

In Step S111, a request to move the magnification varying lens toward the telephoto side and information indicative of a selected zoom speed are set in the aforesaid information to be sent from the camera microcomputer CMC to the lens microcomputer LMC. The process proceeds to Step S112.

In Step S112, the processing of this flowchart is brought to an end.

FIG. 8 is a control flowchart aiding in explaining a zooming operation which constitutes part of the operation of the lens microcomputer LMC according to the second embodiment. This control flowchart will be described with reference to manual zoom by way of example.

Step S121 indicates the start of the processing of this flowchart. In Step S122, it is determined whether the information which the lens microcomputer LMC has received from the camera microcomputer CMC contains a request to stop the magnification varying lens. If such request is contained, the process proceeds to Step S130; otherwise, the process proceeds to Step S123.

In Step S123, it is determined whether a direction in which to move the magnification varying lens is a telephoto direction or a wide-angle direction. If the information received from the camera microcomputer CMC indicates the telephoto direction, the process proceeds to Step S124, whereas if the information received indicates the wide-angle direction, the process proceeds to Step S125.

In Step S124, it is determined whether the magnification varying lens is located at the telephoto end. If the magnification varying lens is located at the telephoto end, the process proceeds to Step S130; otherwise, the process proceeds to Step S126.

In Step S125, it is determined whether the magnification varying lens is located at the wide-angle end. If the magnification varying lens is located at the wide-angle end, the process proceeds to Step S130; otherwise, the process proceeds to Step S126.

In Step S126, it is determined whether the current position of the magnification varying lens is a magnification-varying-lens position (boundary position) having any of the representative locus data stored in the lens microcomputer LMC. If the current position of the magnification varying lens does not lie on the boundary position z(n), it is determined that no locus calculation can be performed, and the process proceeds to Step S129, in which the previously calculated direction and speed of movement of each of the magnification varying lens and the focusing lens are held.

On the other hand, if it is determined in Step S126 that the current position of the magnification varying lens lies on the boundary position z(n), the process proceeds to Step S127.

In Step S127, the tracking focusing-lens position p(n+1) at an adjacent boundary is calculated from Expression (1), while taking account of the selected-zoom-speed information sent from the camera microcomputer CMC.

In Step S128, the moving speed Vz of the magnification varying lens is calculated. In this step, the moving speed Vz is set to a value obtained by reading, as a parameter, a magnification-varying-lens position from the zoom speed table stored in the lens microcomputer LMC. This table is obtained by a method similar to that shown in FIG. 2.

Further, in Step S128, the moving speed Vf of the compensation (focusing) lens is calculated from Expression (2) by employing the tracking focusing-lens position p(n+1) and the moving speed Vz of the magnification varying lens, and the process proceeds to Step S130.

In Step S129, the compensation lens and the magnification varying lens are driven. If Vf is positive, a direction in which to move the compensation lens during zooming is a closest-distance direction, whereas if Vf is negative, such direction is an infinity direction. If Vf=0, the focusing lens is brought to a stop.

In Step S130, the magnification varying lens is brought to a stop, and the process proceeds to Step S131 which indicates the end of this flowchart.

As is apparent from the above described, according to the present embodiment, since information relative to the amount of variation per unit time of the focal length of the magnification varying lens can be supplied to the camera-body side, even if a lens unit having any characteristics is secured to the camera body, the electronic zoom can be executed on the camera-body side at an enlargement rate matched to the characteristics of the lens unit. Accordingly, it is possible to effect a smooth transition from the optical zoom to the electronic zoom or vice versa without causing an unnatural or abrupt change in an image due to a sharp variation in the magnification variation rate.

In addition, according to the present embodiment, since the information relative to the position of the magnification varying lens is transmitted to the camera body, it is possible to effect a smooth transition from the optical zoom to the electronic zoom without causing an unnatural or abrupt change in an image, according to an appropriate position of the optical zoom, for example, on the telephoto end.

According to the above-described embodiment, information relative to the amount of variation per unit time of the focal length of the magnification varying lens is prepared as a plurality of pieces of information corresponding to different speeds of the magnification varying lens, so that if a plurality of zoom speeds can be selectively used for the magnification varying lens, enlargement rates corresponding to the respective zoom speeds can be transmitted to the camera-body side. Accordingly, even if any kind of lens unit is secured to the camera body or the moving speed of the magnification varying lens of a lens unit secured to the camera body is not constant, it is possible to realize not only a smooth transition from the optical zoom to the electronic zoom or vice versa, but also smooth zooming capable of consistently maintaining an in-focus state.

In addition, according to the above-described embodiment, since information relative to the amount of variation per unit time of the focal length of the magnification varying lens of the lens unit can be supplied therefrom to the camera-body side, even if a lens unit having any characteristics is secured to the camera body, the electronic zoom can be executed on the camera-body side at an enlargement rate matched to the characteristics of the lens unit. Accordingly, it is possible to realize a camera capable of effecting a smooth transition from the optical zoom to the electronic zoom or vice versa without causing an unnatural or abrupt change in an image due to a sharp variation in the magnification variation rate.

In addition, according to the above-described embodiment, since the information relative to the position of the magnification varying lens is transmitted to the camera body, it is possible to effect a smooth transition from the optical zoom to the electronic zoom without causing an unnatural or abrupt change in an image, according to an appropriate position of the optical zoom, for example, on the telephoto end.

According to the above-described embodiment, information relative to the amount of variation per unit time of the focal length of the magnification varying lens is prepared as a plurality of pieces of information corresponding to different speeds of the magnification varying lens, so that if a plurality of zoom speeds can be selectively used for the magnification varying lens, enlargement rates corresponding to the respective zoom speeds can be transmitted to the camera-body side. Accordingly, even if any kind of lens unit is secured to the camera body or the moving speed of the magnification varying lens of a lens unit secured to the camera body is not constant, it is possible to realize not only a smooth transition from the optical zoom to the electronic zoom or vice versa, but also smooth zooming capable of consistently maintaining an in-focus state.

In addition, according to the above-described embodiment, since information relative to the amount of variation per unit time of the focal length of the magnification varying lens of the lens unit can be supplied therefrom to the camera-body side, even if a lens unit having any characteristics is secured to the camera body, the electronic zoom can be executed on the camera-body side at an enlargement rate matched to the characteristics of the lens unit. Accordingly, it is possible to realize an image pickup apparatus capable of effecting a smooth transition from the optical zoom to the electronic zoom or vice versa without causing an unnatural or abrupt change in an image due to a sharp variation in the magnification variation rate.

In addition, according to the above-described embodiment, since the information relative to the position of the magnification varying lens is transmitted to the camera body, it is possible to effect a smooth transition from the optical zoom to the electronic zoom without causing an unnatural or abrupt change in an image, according to an appropriate position of the optical zoom, for example, on the telephoto end.

In addition, according to the above-described embodiment, information relative to the amount of variation per unit time of the focal length of the magnification varying lens is prepared as a plurality of pieces of information corresponding to different speeds of the magnification varying lens, so that if a plurality of zoom speeds can be selectively used for the magnification varying lens, enlargement rates corresponding to the respective zoom speeds can be transmitted to the camera-body side. Accordingly, even if any kind of lens unit is secured to the camera body or the moving speed of the magnification varying lens of a lens unit secured to the camera body is not constant, it is possible to realize not only a smooth transition from the optical zoom to the electronic zoom or vice versa, but also smooth zooming capable of consistently maintaining an in-focus state.

In addition, according to the above-described embodiment, a first communication mode for mainly communicating information peculiar to a lens unit and a second communication mode for mainly communicating information indicative of control of the lens unit and the state thereof can be selectively set. In the first communication mode, since information relative to the amounts of variation per unit time of the focal length of a magnification varying lens which respectively correspond to a plurality of moving speeds thereof, not only information peculiar to the lens unit but also the enlargement rate of the magnification varying lens according to the magnification variation speed thereof can be obtained. Accordingly, even if a lens unit having any characteristics is secured to the camera body and no matter how the driving speed of its magnification varying lens varies, the electronic zoom can be executed at an enlargement rate matched to the characteristics of the lens unit. Accordingly, it is possible to realize an image pickup apparatus capable of effecting a smooth transition from the optical zoom to the electronic zoom or vice versa without causing an unnatural or abrupt change in an image due to a sharp variation in the magnification variation rate.

In addition, since the information relative to the position of the magnification varying lens is obtained when the second communication mode is set, it is possible to effect a smooth transition from the optical zoom to the electronic zoom without causing an unnatural or abrupt change in an image, according to an appropriate position of the optical zoom, for example, on the telephoto end.

A third embodiment of the present invention will be described below. First of all, the background of the third embodiment will be referred to below.

A so-called hill-climbing system is known as an automatic focus adjusting system for use in a video apparatus such as a video camera. The hill-climbing system is arranged to perform adjustment of focus by extracting a high-frequency component of a video signal obtained from an image pickup element, such as a CCD, and driving a photographing lens so that the level of the high-frequency component reaches a maximum.

Such an automatic focus adjusting system has a number of advantages. For example, no special optical member for focus adjustment is needed, and a subject can be accurately focused irrespective of the subject distance whether the subject lies at a far distance or at a close distance.

Figure 21:
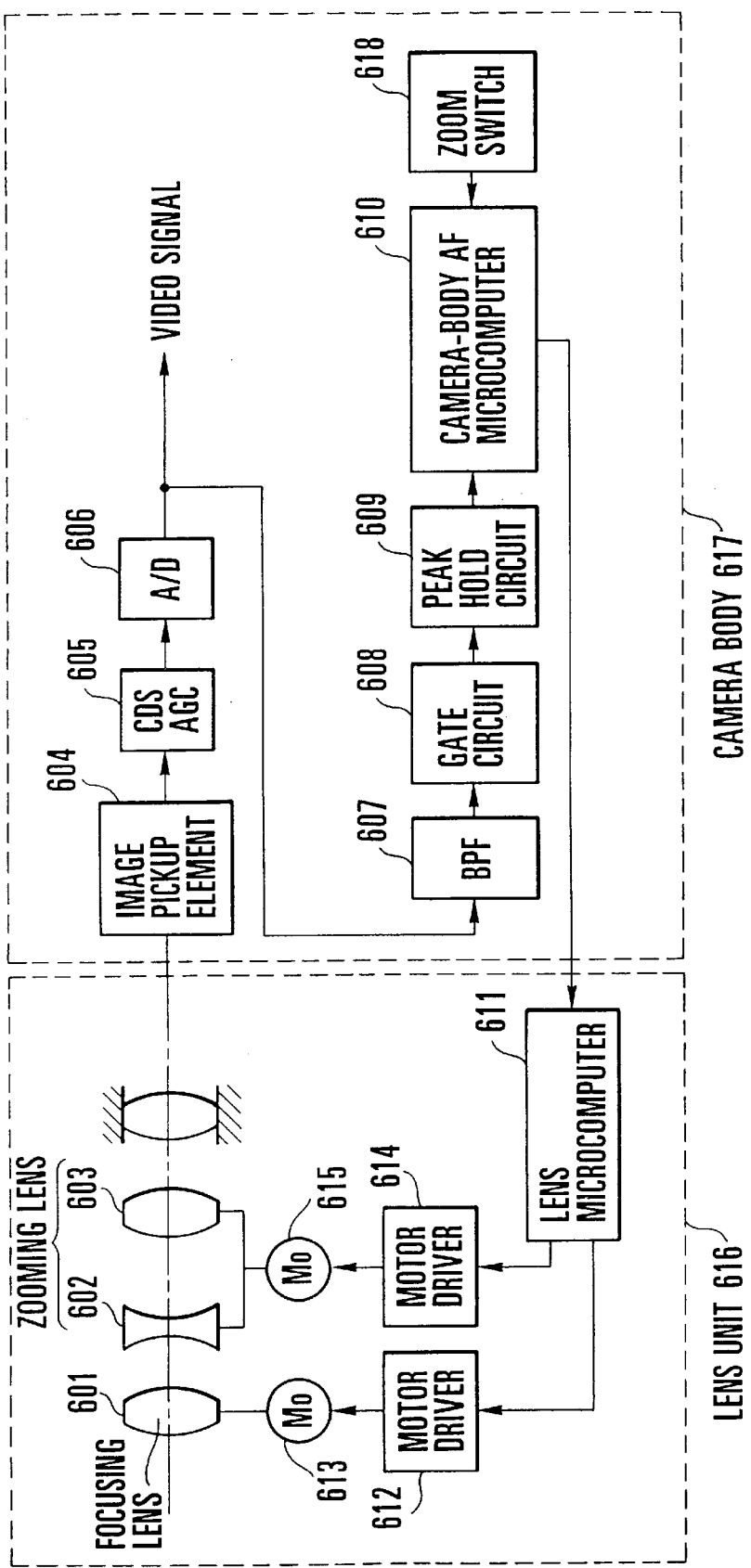
FIG. 21 is a block diagram showing a representative arrangement of a conventional automatic focus adjusting system.

One example in which this kind of automatic focus adjusting system is used in an interchangeable-lens type video camera capable of using interchangeable lenses will be described below with reference to FIG. 21.

In a conventional lens unit capable of varying its magnification, a magnification varying lens 602 and a compensation lens 603 are mechanically coupled to each other by a cam, and if a magnification varying operation is performed manually or by power driving, the magnification varying lens 602 and the compensation lens 603 integrally move. The magnification varying lens 602 and the compensation lens 603 will be hereinafter referred to collectively as the zooming lens.

In such a lens system, a front lens 601 serves as a focusing lens and performs focusing by moving along the optical axis of the lens system. Light passing through these lenses 601, 602 and 603 is focused on the image pickup surface of an image pickup element 604. The image pickup element 604 photoelectrically converts the focused light into an electrical signal and outputs the electrical signal as a video signal.

This video signal is subjected to a sample-and-hold process and amplified to a predetermined level in a CDS/AGC circuit 605. The thus-amplified signal is converted into digital video data by an A/D converter 606, and the digital video data is inputted to a process circuit of a camera body 617, in which it is converted into a prescribed standard television signal. The digital video data outputted from the A/D converter 606 is also inputted to a band-pass filter (BPF) 607.

The BPF 607 extracts a high-frequency component of the video signal which varies according to the state of focus, and a gate circuit 608 extracts from the high-frequency component a signal which corresponds to a portion set as a focus detecting area in an image plane. A peak hold circuit 609 performs peak holding at intervals synchronized with an integer times the period of a vertical synchronizing signal, thereby generating an AF evaluation value.

This AF evaluation value is inputted to an AF microcomputer 610 provided in the camera body 617. The AF microcomputer 610 determines a driving speed of the focusing lens 601 (a focusing motor 613) according to the degree of focusing, and a driving direction of the focusing motor 613 which makes the AF evaluation value increase. The AF microcomputer 610 sends the driving speed and direction of the focusing motor 613 to a lens microcomputer 611 provided in a lens unit 616.

The lens microcomputer 611 drives the focusing motor 613 via a motor driver 612 in accordance with an instruction given by the AF microcomputer 610 of the camera body 617, thereby moving the focusing lens 601 along the optical axis to execute focus adjustment.

In addition, the AF microcomputer 610 determines a driving direction and a driving speed of the zooming lens (602 and 603) according to the state of manipulation of a zoom switch 618, and sends the driving direction and speed to a zooming-motor driver 614 provided in the lens unit 616 and causes the zooming-motor driver 614 to drive a zooming motor 615, thereby driving the zooming lens (602 and 603).

The camera body 617 and the lens unit 616 can be separated from each other, so that the range of photography can be made wider by connecting a different lens unit to the camera body 617.

However, in the above-described example, since interchangeable lens units can be used with the camera body 617, an AF control part and a part for setting the size of the focus detecting area to be extracted from the image plane are provided in the camera body 617. If the size of the focus detecting area is determined as a size optimum for only a specific kind of lens unit, such size is not always optimum for various other lens units, so that performance optimum for any kind of lens unit is difficult to realize. For example, if the size of the focus detecting area is set for a wide-angle-photography priority type of lens unit and a telephoto-photography priority type of lens unit is secured to the camera body, the motion of a subject within the focus detecting area becomes vehement because the image of the subject is enlarged by the telephoto-photography priority type of lens unit. As a result, an AF evaluation value varies vehemently and AF performance is degraded.

In addition, because the image of the subject is enlarged, the contrast of the subject is low and defocusing of the subject is induced. Even in the case of the same lens if a magnification varying operation is performed or the focal length is varied, as by electronic zoom, the aforesaid problem occurs.

An object of the third embodiment is, therefore, to provide an interchangeable-lens type camera system which is capable of stably bringing an intended main subject into focus under any photographic condition irrespective of the kind of subject, whatever kind of lens unit is secured to the camera body.

To achieve the above object, according to the third embodiment, there is provided a lens unit which is removably secured to a camera body and which comprises a focusing lens group for performing focus adjustment, focus adjusting means for driving the focusing lens group on the basis of a focus evaluation value transmitted from the camera body, area control means for determining a size of a focus detecting area in an image plane, and communication means for transferring to the camera body information indicative of the size of the focus detecting area determined by the area control means.

In addition, according to the third embodiment, the area control means is arranged to vary the size of the focus detecting area according to a focal length of the lens unit.

In addition, according to the third embodiment, there is provided an interchangeable-lens type camera to which a lens unit is interchangeably secured and which comprises image pickup means for converting an image formed by the lens unit into an electrical signal, extraction means for extracting a focus signal inside a focus detecting area in an image plane, from a picked-up image signal outputted from the image pickup means, area control means for receiving predetermined information indicative of a size of the focus detecting area from the image pickup means and controlling the size of the focus detecting area, and transmission means for transmitting to the lens unit an output of the extraction means which corresponds to the focus detecting area having the size determined by the area control means.

In addition, according to the third embodiment, the camera further comprises area position control means for varying a setting position of the focus detecting area in the image plane.

In addition, according to the third embodiment, there is provided an interchangeable-lens type camera system in which a lens unit is interchangeably secured to a camera body and which comprises a first lens group for performing a magnification varying operation, a second lens group for performing focus adjustment, detection means for detecting positions of the respective first and second lens groups, driving means for causing the first and second lens groups to move along an optical axis independently of each other, image pickup means for converting an image formed by the first and second lens groups into an electrical signal, first area control means for determining a position of a focus detecting area in an image plane, second area control means for determining a size of the focus detecting area, extraction means for extracting a focus signal inside the focus detecting area from a picked-up image signal outputted from the image pickup means, and focus adjusting means for performing focus adjustment on the basis of an output of the extraction means, the first and second lens groups, the detection means, the driving means, the focus adjusting means and the second area control means being provided in the lens unit, the image pickup means, the first area control means and the extraction means being provided in the camera body, wherein size information relative to the focus detecting area outputted from the second area control means is transferred from the lens unit to the camera body, and the output of the extraction means which corresponds to the focus signal inside the focus detecting area having the size determined by the area control means on the basis of the size information transferred to the camera body is transferred therefrom to the lens unit.

In addition, according to the third embodiment, the second area control means is arranged to control the size of the focus detecting area according to a focal length of the first lens group detected by the detection means.

In addition, according to the third embodiment, there is provided an interchangeable-lens type camera system which comprises a camera body including extraction means for extracting a focus signal from a picked-up image signal corresponding to a focus detecting area in an image plane and area position control means for determining a position of the focus detecting area in the image plane, and a lens unit including focus detecting means for detecting a state of focus on the basis of the focus signal outputted from the extraction means and area size control means for determining a size of the focus detecting area in the image plane on the basis of optical information relative to the lens unit, wherein the position of the focus detecting area in the image plane is determined in the camera body, and the size of the focus detecting area in the image plane is determined in the lens unit.

The third embodiment of the present invention will be described below with reference to FIGS. 16 to 20.

Figure 16:
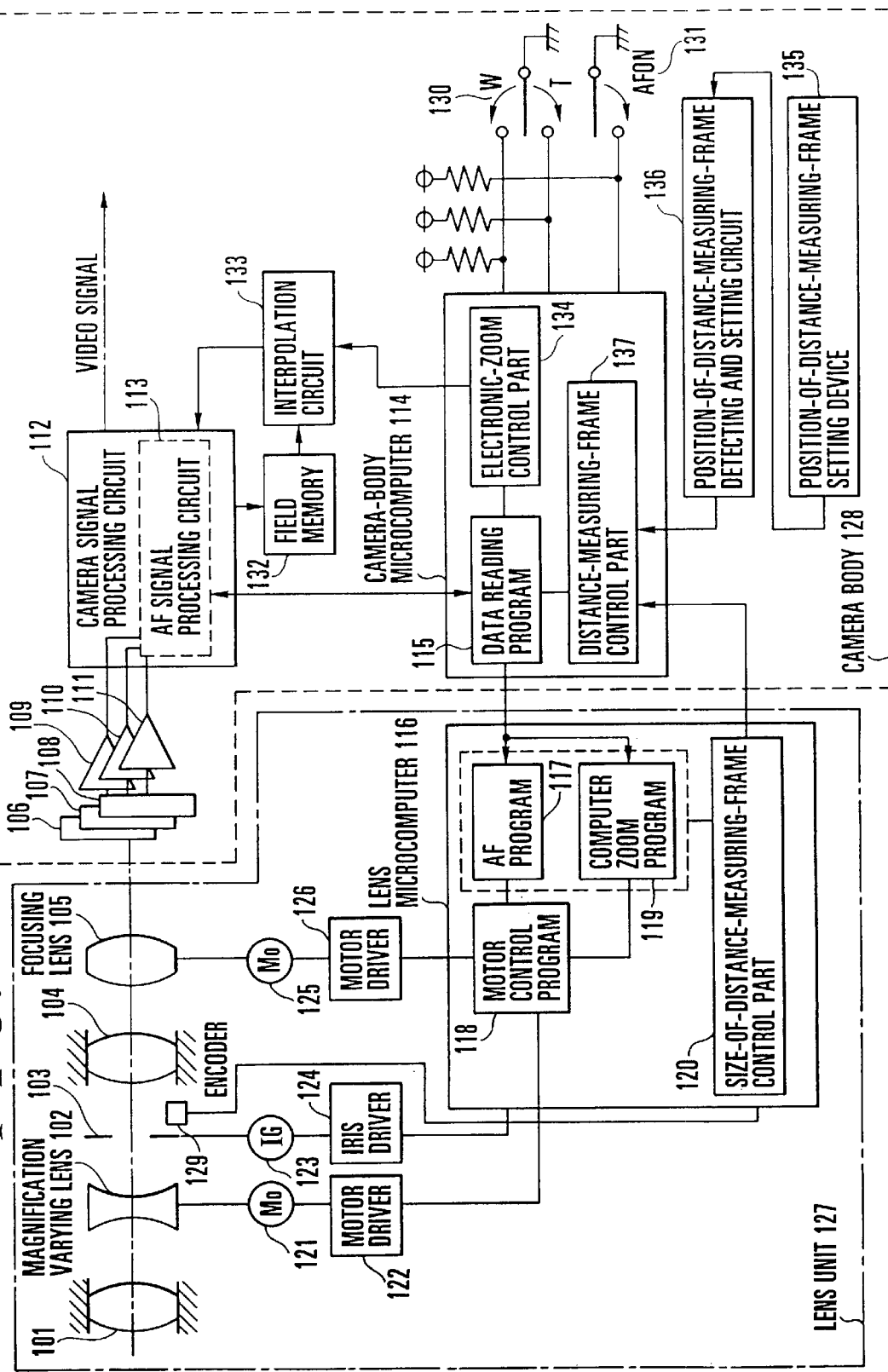
FIG. 16 is a block diagram showing the arrangement of an automatic focus adjusting system according to a third embodiment of the present invention.

FIG. 16 is a block diagram showing the arrangement of the third embodiment of the present invention.

The shown arrangement includes a lens unit 127 and a camera body 128 which constitute a so-called interchangeable-lens type camera system, and the lens unit 127 is removably secured to the camera body 128.

The lens unit 127 includes a fixed first lens group 101, a second lens group (hereinafter referred to as the magnification varying lens) 102 for performing a magnification varying operation, an iris 103, a fixed third lens group 104, and a fourth lens group (hereinafter referred to as the focusing lens) 105 which has both a focus adjusting function and a so-called compensation function for compensating for a movement of a focal plane due to the magnification varying operation. Light from a subject passes through these elements 101, 102, 103, 104 and 105 and is focused on image pickup elements, such as CCDs, provided in the camera body 128.

The image pickup elements in the camera body 128 constitute a so-called three-CCD type of image pickup system in which the image pickup elements are respectively provided for three primary colors, i.e., red (R), green (G) and blue (B).

The red, green and blue components of the three primary colors are respectively focused on image pickup elements 106, 107 and 108.

The respective images focused on the image pickup elements 106, 107 and 108 are photoelectrically converted into electrical signals, and the electrical signals are respectively amplified to optimum levels by amplifiers 109, 110 and 111. The amplified electrical signals are inputted to a camera signal processing circuit 112, and the camera signal processing circuit 112 converts the input signals into a standard television signal and outputs the standard television signal to a video recorder (not shown) or the like. The amplified electrical signals are also inputted to an AF signal processing circuit 113.

The AF signal processing circuit 113 generates an AF evaluation value. The AF evaluation value is read from the AF signal processing circuit 113 at intervals of a period which is an integer times the period of a vertical synchronizing signal, in accordance with a data reading program 115 stored in the camera-body microcomputer 114 provided in the camera body 128, and the read AF evaluation value is transmitted to a lens microcomputer 116 of the lens unit 127.

The camera signal processing circuit 112 detects the level of a luminance signal from the pick-up image signals outputted from the image pickup elements 106, 107 and 108, and the obtained luminance signal information is transmitted to the lens microcomputer 116 of the lens unit 127 via the camera-body microcomputer 114. The lens microcomputer 116 controls an iris driver 124 on the basis of the luminance signal information, and the iris driver 124 drives an IG meter 123 to control the opening and closing operation of the iris 103.

The aperture value of the iris 103 is detected by an encoder 129 and is supplied to the lens microcomputer 116, in which it is used as depth-of-field information.

The camera-body microcomputer 114 of the camera body 128 transmits the states of a zoom switch 130 and an AF switch 131 to the lens microcomputer 116. (If the AF switch 131 is on, an AF operation is selected, whereas if it is off, a manual focusing operation is selected.)

In the lens microcomputer 116, an AF program 117 receives the state of the zoom switch 130, the state of the AF switch 131 and the AF evaluation value from the camera-body microcomputer 114. If the AF switch 131 is on, the AF program 117 operates a motor control program 118 on the basis of the AF evaluation value to drive a focusing motor 125 via a focusing-motor driver 126, so that the focusing lens 105 is moved along the optical axis to execute focus adjustment.

A computer zoom program 119 controls a zoom motor driver 122 to drive a zoom motor 121, so that the magnification varying lens 102 is driven to execute a zooming operation.

If the lens microcomputer 116 receives from the camera-body microcomputer 114 information indicating that the AF switch 131 is off and the zoom switch 130 is being manipulated, the computer zoom program 119 sends a signal to the zoom motor driver 122 so that the magnification varying lens 102 is driven toward its telephoto or wide-angle end specified by the manipulation of the zoom switch 130. Thus, the zoom motor 121 is driven to move the magnification varying lens 102 in the specified direction, thereby executing a magnification varying operation.

During this magnification varying operation, since a focal plane varies with the driving of the magnification varying lens 102, the focusing lens 105 is driven in accordance with a predetermined characteristic together with the driving of the magnification varying lens 102, so that the operation of preventing occurrence of defocusing due to the displacement of the focal plane is executed in parallel.

Specifically, the computer zoom program 119 of the lens microcomputer 116 is provided with a lens cam data table which stores the in-focus point of the focusing lens 105 with respect to the position of the magnification varying lens 102 for each subject distance. In accordance with the computer zoom program 119, the lens microcomputer 116 detects the position of the magnification varying lens 102 and that of the focusing lens 105 through the amounts of driving of the zoom motor 121 and the focusing motor 125 or through encoders (not shown), specifies an in-focus locus to be tracked by the focusing lens 105 during a magnification varying operation thereof, reads the corresponding lens cam data from the lens cam data table, and computes a corrected speed and direction of the focusing lens 105 relative to the magnification varying operation.

If the AF switch 131 is on and the zoom switch 130 is being manipulated, since an in-focus state needs to be held, the computer zoom program 119 refers to the AF evaluation value sent from the camera-body microcomputer 114 and executes a magnification varying operation while holding a position at which the AF evaluation value reaches a maximum.

Specifically, in the motor control program 118, information indicative of the corrected speed and direction of the focusing lens 105 relative to the magnification varying operation, which information has been computed by the computer zoom program 119, is added to focusing-lens driving-speed information based on AF defocusing information outputted from the AF program 117. Thus, the overall driving speed and direction of the focusing lens 105 are computed and supplied to the focusing-motor driver 126.

The aperture value of the iris 103 is detected by the encoder 129, supplied to the lens microcomputer 116, and used as depth-of-field information for the purpose of speed correction of the focusing lens 105 or the like.

If the AF switch 131 is on and the zoom switch 130 is not pressed, the AF program 117 executes an automatic focus adjusting operation by sending a signal to the focusing-motor driver 126 and causing the focusing-motor driver 126 to drive the focusing lens 105 so as to maximize the AF evaluation value sent from the camera-body microcomputer 114.

Figure 17:
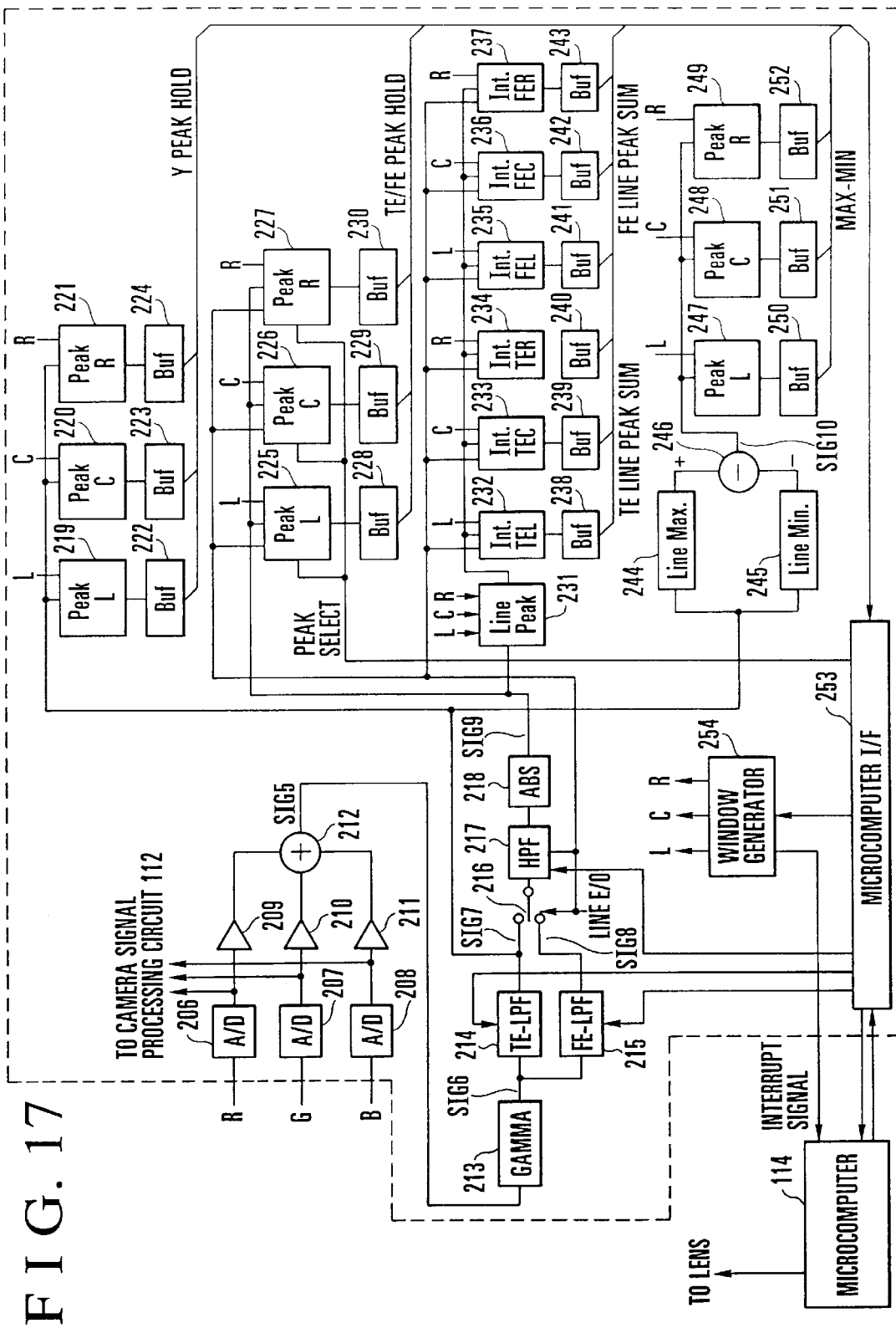
FIG. 17 is a block diagram showing the internal arrangement of an AF signal processing circuit provided on a camera-body side in the automatic focus adjusting system shown in FIG. 16.

The AF signal processing circuit 113 provided in the camera signal processing circuit 112 will be described below with reference to FIG. 17. The image-pickup-element outputs of red (R), green (G) and blue (B) which have been amplified to optimum levels by the respective amplifiers 109, 110 and 111 are supplied to the AF signal processing circuit 113. In the AF signal processing circuit 113, the supplied signals are respectively converted into digital signals by A/D converters 206, 207 and 208, and the digital signals are sent to the camera signal processing circuit 112 and to amplifiers 209, 210 and 211. The amplifiers 209, 210 and 211 respectively amplify the respective digital signals to appropriate levels, and an adder 212 adds together the output signals of the amplifiers 209, 210 and 211 to generate an luminance signal SIG5 for automatic focus adjustment.

The luminance signal SIG5 is inputted to a gamma circuit 213, in which it is formed into a signal SIG6 having an emphasized low-luminance component and a suppressed high-luminance component through gamma conversion according to a preset gamma curve. The gamma-converted signal SIG6 is inputted to a TE-LPF 214 which is-a low-pass filter (LPF) of high cutoff frequency and to an FE-LPF 215 which is an LPF of low cutoff frequency. The TE-LPF 214 and the FE-LPF 215 extract low-frequency components in accordance with their respective filter characteristics which are determined by the camera-body microcomputer 114 through a microcomputer interface 253, and generate output signals SIG7 and SIG8, respectively.

The signals SIG7 and SIG8 are selectively switched therebetween by a switch 216 in accordance with a Line E/O signal which is a signal for discriminating between an even-numbered horizontal line and an odd-numbered horizontal line, and the signals SIG7 and SIG8 are selectively inputted to a high-pass filter (hereinafter referred to as the HPF) 217.

Specifically, the signal SIG7 is supplied to the HPF 217 for each even-numbered horizontal line, whereas the signal SIG8 is supplied to the HPF 217 for each odd-numbered horizontal line.

In the HPF 217, only a high-frequency component is extracted in accordance with an odd- or even-line filter characteristic which is determined by the camera-body microcomputer 114 through the microcomputer interface 253. The extracted high-frequency component is inputted to an absolute-value circuit 218, and the absolute-value circuit 218 converts the input signal into an absolute value to generate a positive signal SIG9. The signal SIG9 is a signal which alternately indicates the levels of the high-frequency components extracted by the respective low-pass filters 214 and 215 of filter characteristics which differ between the even and odd lines. Thus, different frequency components can be obtained from a scanning of one image plane.

Figure 18:
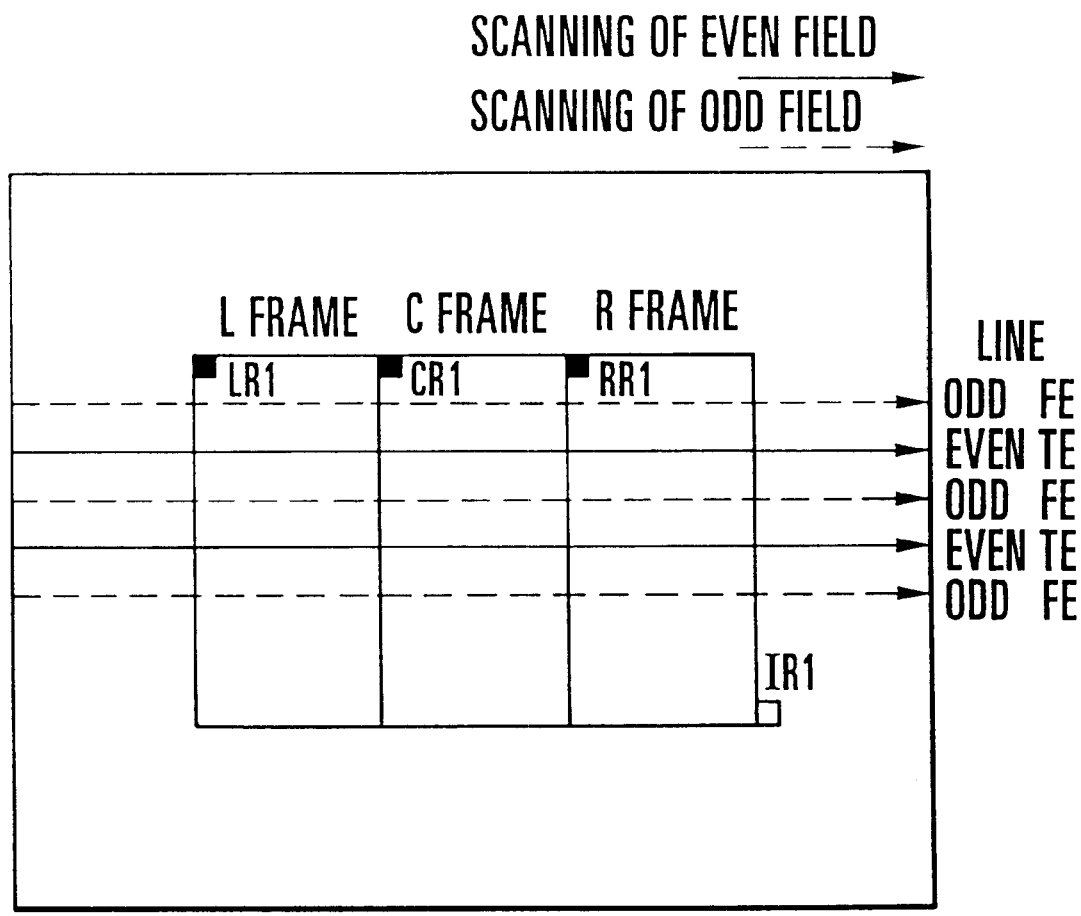
FIG. 18 is a view aiding in describing the operation and the timing of extracting each kind of focus evaluation value in the third embodiment of the present invention.

The signal SIG9 is supplied to peak hold circuits 225, 226 and 227 for detecting the peak values of signals in the respective L, C and R frames shown in FIG. 18, and the peak hold circuits 225, 226 and 227 detect the peak values of high-frequency components in the respective L, C and R frames. The signal SIG9 is also inputted to a line peak hold circuit 231, in which the peak value of each horizontal line is detected.

A frame generating circuit 254 generates gate signals L, C and R for forming the respective L, C and R frames for focus adjustment at different positions within the image plane as shown in FIG. 18, in accordance with an instruction supplied from the camera-body microcomputer 114 via the microcomputer interface 253.

The gate signal L for forming the L frame, which has been outputted from the frame generating circuit 254, and the Line E/O signal (generated by the camera-body microcomputer 114) for discriminating between even- and odd-numbered horizontal lines, are inputted to the peak hold circuit 225. When scanning reaches a top left position LR1 which is the leading position of the focus adjusting L frame shown in FIG. 18, the peak hold circuit 225 is initialized, and subsequently holds the peak values of the signal SIG9 relative to the area within the L frame on the respective even or odd lines which are specified by the camera-body microcomputer 114 through the microcomputer interface 253. When the scanning reaches a bottom right position IR1, i.e., when the scanning of all the areas for focus adjustment is completed the peak hold circuit 225 transmits the peak hold values obtained from the area within the L frame to an area buffer 228, thereby preparing a TE/FE peak evaluation value.

Similarly, the gate signal C for forming the C frame, which has been outputted from the frame generating circuit 254, and the Line E/O signal are inputted to the peak hold circuit 226. When the scanning reaches a top left position CR1 which is the leading position of the focus adjusting C frame shown in FIG. 18, the peak hold circuit 226 is initialized, and subsequently holds the peak values of the signal SIG9 relative to the area within the C frame on the respective even or odd lines which are specified by the camera-body microcomputer 114 through the microcomputer interface 253. When the scanning reaches the bottom right position IR1, i.e., when the scanning of all the areas for focus adjustment is completed, the peak hold circuit 226 transmits the peak hold values obtained from the area within the C frame to an area buffer 229, thereby preparing a TE/FE peak evaluation value.

Similarly, the gate signal R for forming the R frame, which has been outputted from the frame generating circuit 254, and the Line E/O signal are inputted to the peak hold circuit 227. When the scanning reaches a top left position RR1 which is the leading position of the focus adjusting R frame shown in FIG. 18, the peak hold circuit 227 is initialized, and subsequently holds the peak values of the signal SIG9 relative to the area within the R frame on the respective even or odd lines which are specified by the camera-body microcomputer 114 through the microcomputer interface 253. When the scanning reaches the bottom right position IR1, i.e., when the scanning of all the areas for focus adjustment is completed, the peak hold circuit 227 transmits the peak hold values obtained from the area within the R frame to an area buffer 230, thereby preparing a TE/FE peak evaluation value.

The signal SIG9 and the gate signals L, C and R for generating the L, C and R frames, which have been outputted from the frame generating circuit 254, are also inputted to the line peak hold circuit 231, and the line peak hold circuit 231 is initialized at the starting point of each horizontal line in each of the L, C and R frames and holds the peak value of the signal SIG9 on one horizontal line in each of the L, C and R frames.

The output of the line peak hold circuit 231 and the Line E/O signal for discriminating between even- and odd-numbered horizontal lines are inputted to each of integration circuits 232, 233, 234, 235, 236 and 237. At the same time, the gate signal L for forming the L frame, outputted from the frame generating circuit 254, is inputted to each of the integration circuits 232 and 235; the gate signal C for forming the C frame, outputted from the frame generating circuit 254, is inputted to each of the integration circuits 233 and 236; and the gate signal R for forming the R frame, outputted from the frame generating circuit 254, is inputted to each of the integration circuits 234 and 237.

The integration circuit 232 is initialized when scanning reaches the top left position LR1 which is the leading position of the focus adjusting L frame, and adds the output of the line peak hold circuit 231 to the value of an internal register of the integration circuit 232 immediately before the end of scanning of each even line within the L frame. When the scanning reaches the position IRI, the integration circuit 232 transmits the peak hold value to an area buffer 238, thereby preparing a line peak integral evaluation value.

The integration circuit 233 is initialized when scanning reaches the top left position CR1 which is the leading position of the focus adjusting C frame, and adds the output of the line peak hold circuit 231 to the value of an internal register of the integration circuit 233 immediately before the end of scanning of each even line within the C frame. When the scanning reaches the position IRI, the integration circuit 233 transmits the peak hold value to an area buffer 239, thereby preparing a line peak integral evaluation value.

The integration circuit 234 is initialized when scanning reaches the top left position RR1 which is the leading position of the focus adjusting R frame, and adds the output of the line peak hold circuit 231 to the value of an internal register of the integration circuit 234 immediately before the end of scanning of each even line within the R frame. When the scanning reaches the position IR1, the integration circuit 234 transmits the peak hold value to an area buffer 240, thereby preparing a line peak integral evaluation value.

Unlike the integration circuits 232, 233 and 234, the integration circuits 235, 236 and 237 perform additions of not even line data but odd line data, and then perform operations similar to those of the respective integration circuits 232, 233 and 234 and transmit the respective results to area buffers 241, 242 and 243.

The signal SIG7 is also inputted to each of peak hold circuits 219, 220 and 221 and to each of a line maximum value hold circuit 244 and a line minimum value hold circuit 245.

The gate signal L for forming the L frame, outputted from the frame generating circuit 254, is inputted to the peak hold circuit 219, and the peak hold circuit 219 is initialized when scanning reaches the top left position LR1 which is the leading position of the L frame, and holds the peak value of the signal SIG7 on each horizontal line in the L frame. When the scanning reaches the position IR1, the peak hold circuit 219 transmits the peak hold result to a buffer 222, thereby preparing a peak evaluation value of a luminance level (hereinafter referred to as the Y signal).

Similarly, the gate signal C for forming the C frame, outputted from the frame generating circuit 254, is inputted to the peak hold circuit 220, and the peak hold circuit 220 is initialized when the scanning reaches the top left position CR1 which is the leading position of the C frame, and holds the peak value of the signal SIG7 on each horizontal line in the C frame. When the scanning reaches the position IR1, the peak hold circuit 220 transmits the peak hold result to a buffer 223, thereby preparing a Y-signal peak evaluation value.

Similarly, the gate signal R for forming the R frame, outputted from the frame generating circuit 254, is inputted to the peak hold circuit 221, and the peak hold circuit 221 is initialized when the scanning reaches the top left position RR1 which is the leading position of the R frame, and holds the peak value of the signal SIG7 on each horizontal line in the R frame. When the scanning reaches the position IR1, the peak hold circuit 221 transmits the peak hold result to a buffer 224, thereby preparing a Y-signal peak evaluation value.

Each of the gate signals L, C and R for forming the L, C and R frames, outputted from the frame generating circuit 254, is also inputted to the line maximum value hold circuit 244 and to the line minimum value hold circuit 245. When scanning reaches the horizontal starting point of each of the L, C and R frames, the line maximum value hold circuit 244 and the line minimum value hold circuit 245 are initialized, and respectively hold maximum and minimum values of the Y signal of the signal SIG7 on one horizontal line in each of the L, C and R frames.

The maximum and minimum values of the Y signal which have respectively been held by the line maximum value hold circuit 244 and the line minimum value hold circuit 245 are inputted to a subtracter 246, and the subtracter 246 calculates a (maximum value−minimum value) signal, i.e., a signal SIG10 indicative of contrast, and inputs the signal SIG10 to each of peak hold circuits 247, 248 and 249.

The gate signal L for forming the L frame is inputted to the peak hold circuit 247 from the frame generating circuit 254, and the peak hold circuit 247 is initialized when scanning reaches the top left position LR1 which is the leading position of the L frame, and holds the peak value of the signal SIG10 on each horizontal line in the L frame. When the scanning reaches the position IR1, the peak hold circuit 247 transmits the peak hold result to a buffer 250, thereby preparing a Max–Min evaluation value.

Similarly, the gate signal C for forming the C frame is inputted to the peak hold circuit 248 from the frame generating circuit 254, and the peak hold circuit 248 is initialized when scanning reaches the top left position CR1 which is the leading position of the C frame, and holds the peak value of the signal SIG10 on each horizontal line in the C frame. When the scanning reaches the position IR1, the peak hold circuit 247 transmits the peak hold result to a buffer 251, thereby preparing a Max–Min evaluation value.

Similarly, the gate signal R for forming the R frame is inputted to the peak hold circuit 249 from the frame generating circuit 254, and the peak hold circuit 249 is initialized when scanning reaches the top left position RR1 which is the leading position of the R frame, and holds the peak value of the signal SIG10 on each horizontal line in the R frame. When the scanning reaches the position IR1, the peak hold circuit 249 transmits the peak hold result to a buffer 252, thereby preparing a Max–Min evaluation value.

When the scanning reaches the position IR1, i.e., at the time of the completion of the scanning of the entire focus detecting area consisting of the L, C and R frames, the data obtained from the respective L, C and R frames are transmitted to the corresponding buffers 222, 223, 224; 228, 229, 230; 238, 239, 240; 241, 242, 243; and 250, 251, 252, and at the same time an interrupt signal is sent from the frame generating circuit 254 to the camera-body microcomputer 114 so that the processing of transmitting the data transmitted to the respective buffers to the camera-body microcomputer 114 is performed.

Specifically, the camera-body microcomputer 114 receives the interrupt signal, and reads the stored data from the respective buffers 222, 223, 224; 228, 229, 230; 238, 239, 240; 241, 242, 243; and 250, 251, 252 through the microcomputer interface 253 by the time when the next scanning of each of the L, C and R frames is completed and the next data are transmitted to the respective buffers, and transmits the read data to the lens microcomputer 116 in synchronism with the vertical synchronizing signal, as will be described later.

The lens microcomputer 116 computes these focus evaluation values to detect the state of focus, and performs a computation on a focusing-motor driving speed, a focusing-motor driving direction and the like and controls the driving of the focusing motor 125 to drive the focusing lens 105.

The timing of inputting the aforesaid various kinds of information in the AF signal processing circuit 113 will be described below with reference to FIG. 18 which is a view showing the layout of focus detecting areas in an image plane.

In FIG. 18, an outside rectangular frame defines the effective image-pickup image plane outputted from the image pickup elements 106, 107 and 108. Three inside rectangular frames, i.e., the L, C and R frames, serve as focus detecting gate frames. The left L frame, the central C frame and the right R frame are respectively formed in accordance with the gate signal L for forming the L frame, the gate signal for forming the C frame, and the gate signal for forming the C frame all of which are outputted from the frame generating circuit 254.

Reset signals for the respective L, C and R frames are outputted at the respective starting positions thereof to generate the respective initializing (reset) signals LR1, CR1 and RR1, thereby resetting the integration circuits 232 to 237, the peak hold circuits 219 to 221, 225 to 227, 247 to 249 and so on.

Upon completion of the scanning of the entire focusing detecting area consisting of the L, C and R frames, the data transmission signal IR1 is generated so that the integral values of the respective integration circuits and the peak hold values of the respective peak hold circuits are transmitted to the corresponding buffers.

In FIG. 18, solid lines represent the scanning of an even field, while dashed lines represent the scanning of an odd field. In either scanning, the TE-LPF output is selected in the case of even lines, whereas the FE-LPF output is selected in the case of odd lines.

A setting method for positions at which to generate the reset signals LR1, CR1 and RR1 for the respective L, C and R frames, and a position at which to generate the data transmission signal IR1 will be described below with reference to FIGS. 16 and 19.

In the present embodiment, the sizes and the positions of the L, C and R frames, i.e., distance measuring frames, can be varied, and the positions at which to set the respective L, C and R frames are determined in the camera body 128, while their sizes are determined in the lens unit 127.

Referring to FIG. 16, the camera body 128 includes a position-of-distance-measuring-frame setting device 135 for enabling a photographer to specify where in the image plane a main subject to be photographed is located. The position-of-distance-measuring-frame setting device 135 may be any type of device capable of specifying a position in the image plane, for example, any other input device such as a joystick, a track ball or a mouse, or a visual-line input device which detects a fixation point of a photographer who is viewing an image-pickup image plane in a viewfinder.

Figure 19:
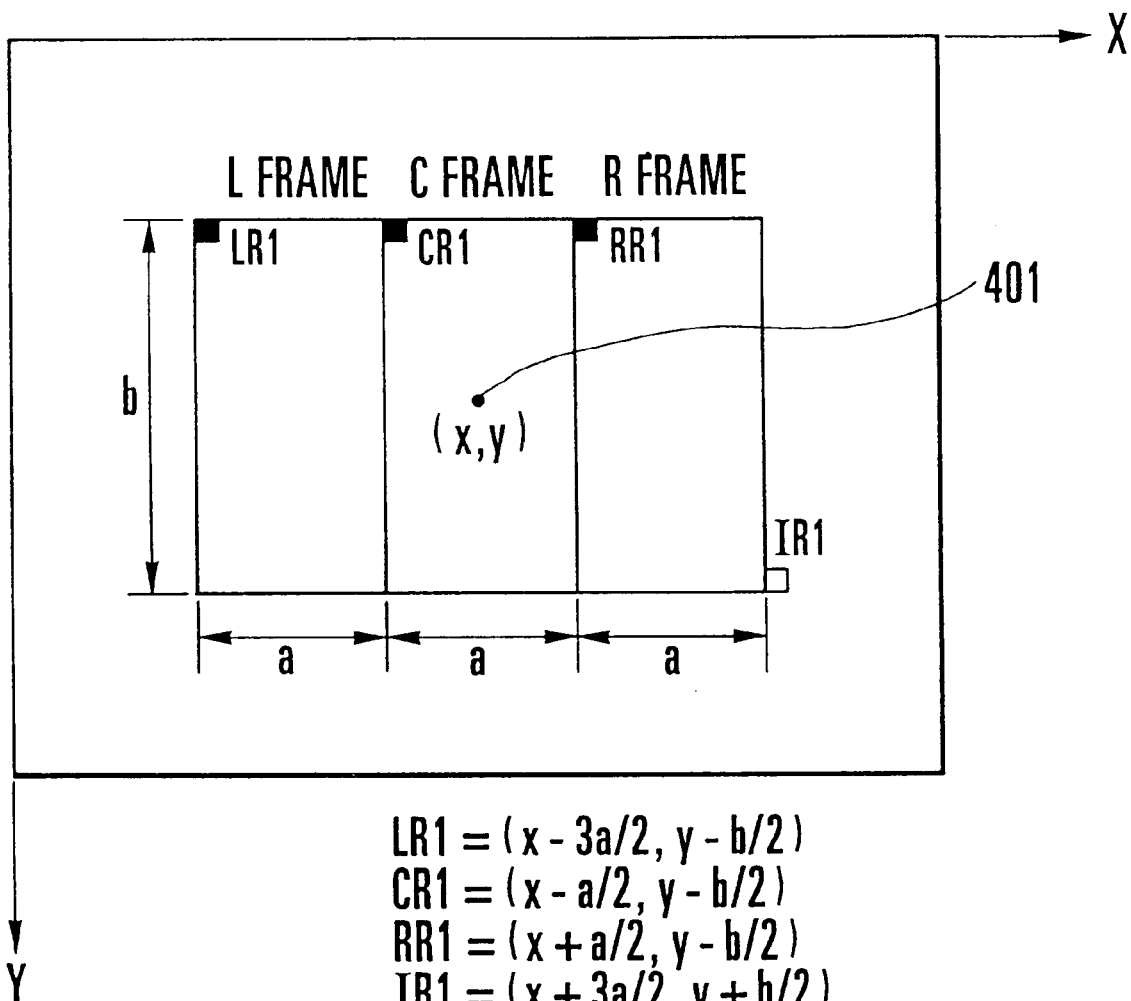
FIG. 19 is a view aiding in describing the operation of setting the size and the position of a distance measuring frame in the third embodiment of the present invention.

In a position-of-distance-measuring-frame detecting and setting circuit 136, a signal from the position-of-distance-measuring-frame setting device 135 is converted into position coordinates in the image plane (for example, the coordinates of a point 401=(x, y): the origin of this coordinate system is the top left position of the image plane shown in FIG. 19). The position-of-distance-measuring-frame detecting and setting circuit 136 takes the position coordinates as the coordinates of the central point of the distance measuring frame, and sends the coordinates of the central point to a distance-measuring-frame control part 137 provided in the camera-body microcomputer 114.

A size-of-distance-measuring-frame control part 120 provided in the lens microcomputer 116 determines the size of the distance measuring frame and sends the determined size to the distance-measuring-frame control part 137 of the camera-body microcomputer 114 as size information (in FIG. 19, a horizontal width "a" and a vertical width "b" of each distance measuring frame).

The distance-measuring-frame control part 137 determines the coordinates of each of LR1, CR1, RR1 and IR1 in the image plane, as shown in FIG. 19, from the central-position information and the size information relative to the distance measuring frame, provided by the position-of-distance-measuring-frame detecting and setting circuit 136 and the size-of-distance-measuring-frame control part 120. The distance-measuring-frame control part 137 sends the determined coordinates of each of LR1, CR1, RR1 and IR1 to the frame generating circuit 254 of the AF signal processing circuit 113, so that control of the distance measuring L, C and R frames is performed.

The reason why the size of each distance measuring frame is altered on the lens-unit side is that stable AF performance can be realized irrespective of the kind of lens unit by suppressing the influence of a camera manipulation or a hand shake on a picked-up image in accordance with the focal length of each lens unit.

If the frame size is set to a fixed size on the camera-body side, as a telephoto lens unit of higher magnification is secured to the camera body, the size of a subject image within the distance measuring frame becomes larger. As a result, the contrast of the image becomes extremely low and the subject image within the distance measuring frame vehemently moves by the influence of a hand shake or the like, so that an unstable AF operation occurs.

Another approach is to transfer focal-length information from the lens unit to the camera-body side and control the frame size on the camera-body side. However, in this approach, if the frame size varies, the level of an integral evaluation value for an AF evaluation value varies, so that the frame size must be switched according to the kind of AF control to prevent occurrence of a malfunction of AF. As a result, the interchange of evaluation values or frame switching information between the lens unit and the camera body becomes very complicated.

For the above reason, the lens microcomputer 116 determines a distance-measuring-frame size optimum for stabilization of AF according to the characteristics of each lens unit, as by setting the distance-measuring-frame size to a larger size for a more telephoto angle of view, and transfers the obtained frame size information to the camera body 128.

Distance-measuring-frame size control for an electronic-zoom function for varying the magnification of an image by image processing will be described below. A video signal processed by the camera signal processing circuit 112 shown in FIG. 16 is stored in a field memory 132. An interpolation circuit 133 performs interpolations between scanning lines and pixels while reading the stored video signal from the field memory 132, and outputs an enlarged-image signal indicative of a horizontally and vertically enlarged image.

The output enlarged-image signal is again subjected to chrominance processing and the like in the camera signal processing circuit 112, and is converted into a standard TV signal.

The interpolation circuit 133 is controlled according to enlargement-rate information supplied from an electronic-zoom control part 134 provided in the camera-body microcomputer 114.

The enlargement-rate information for the electronic zoom, supplied from the electronic-zoom control part 134, is sent to the lens microcomputer 116, and the size-of-distance-measuring-frame control part 120 in the lens microcomputer 116 converts the enlargement-rate information into a focal length optimum for the current picked-up image and controls the distance-measuring-frame size according to the newly set focal length.

The following description is made in connection with how the lens microcomputer 116 performs an automatic focus adjusting operation by using the TE/FE peak evaluation value, the TE line peak integral evaluation value, the FE line peak integral evaluation value, the Y-signal peak evaluation value and the Max–Min evaluation value, all of which are obtained from each of the L, C and R frames.

The TE/FE peak evaluation value is an evaluation value indicative of the degree of focusing. This evaluation value is suitable for use in making a decision as to the degree of focusing and an AF restart operation, because the evaluation value is a peak hold value and its subject dependence is comparatively small and the influence of a camera shake or the like on the evaluation value is small.

Each of the TE line peak integral evaluation value and the FE line peak integral evaluation value also indicates the degree of focusing. Since either evaluation value is an evaluation value which is noise-reduced and stable owing to an integration effect, the evaluation value is suitable for use in making a decision as to a direction in which to drive a focusing lens.

In addition, frequency components extracted for the TE peak evaluation value and the TE line peak integral evaluation value are respectively higher than those extracted for the EF peak evaluation value and the FE line peak integral evaluation value, so that the former TE evaluation values are suitable for use in performing AF processing when the focusing lens is located in the vicinity of an in-focus point, while the latter FE evaluation value is suitable for use in performing AF processing when the focusing lens is away from an in-focus point in a greatly defocused state. Accordingly, by adding together the TE and FE signals or by selectively using the TE and FE signals according to the level of the TE signal, it is possible to effect an AF operation having a wide dynamic range capable of coping with not only the AF processing required when the focusing lens is in the greatly defocused state, but also the AF processing required when the focusing lens is located in the vicinity of the in-focus point.

The Y-signal peak evaluation value and the Max–Min evaluation value do not greatly depend on the degree of focusing, but depend on the states of subjects. Accordingly, these evaluation values are suitable for use in grasping the status of a subject, such as a motion of the subject and a change in the state of the subject, so that a degree-of-focusing decision, a restart decision and a direction decision can be performed accurately. In addition, a focus evaluation value is used for performing normalization for the purpose of eliminating the influence of a brightness variation.

Specifically, it is determined whether the luminance of a subject is high or low, by using the Y-signal peak evaluation value, and it is determined whether the contrast of an image is high or low, by using the Max–Min evaluation value, and the size of a hill is predicted and corrected by using the TE/FE peak evaluation value, the TE line peak integral evaluation value and the FE line peak integral evaluation value. Thus, optimum AF control can be effected.

Those evaluation values are transmitted from the camera body 128 to the lens unit 127 and is then supplied to the lens microcomputer 116 in the lens unit 127, so that an automatic focus adjusting operation is performed by the lens microcomputer 116.

Figure 20:
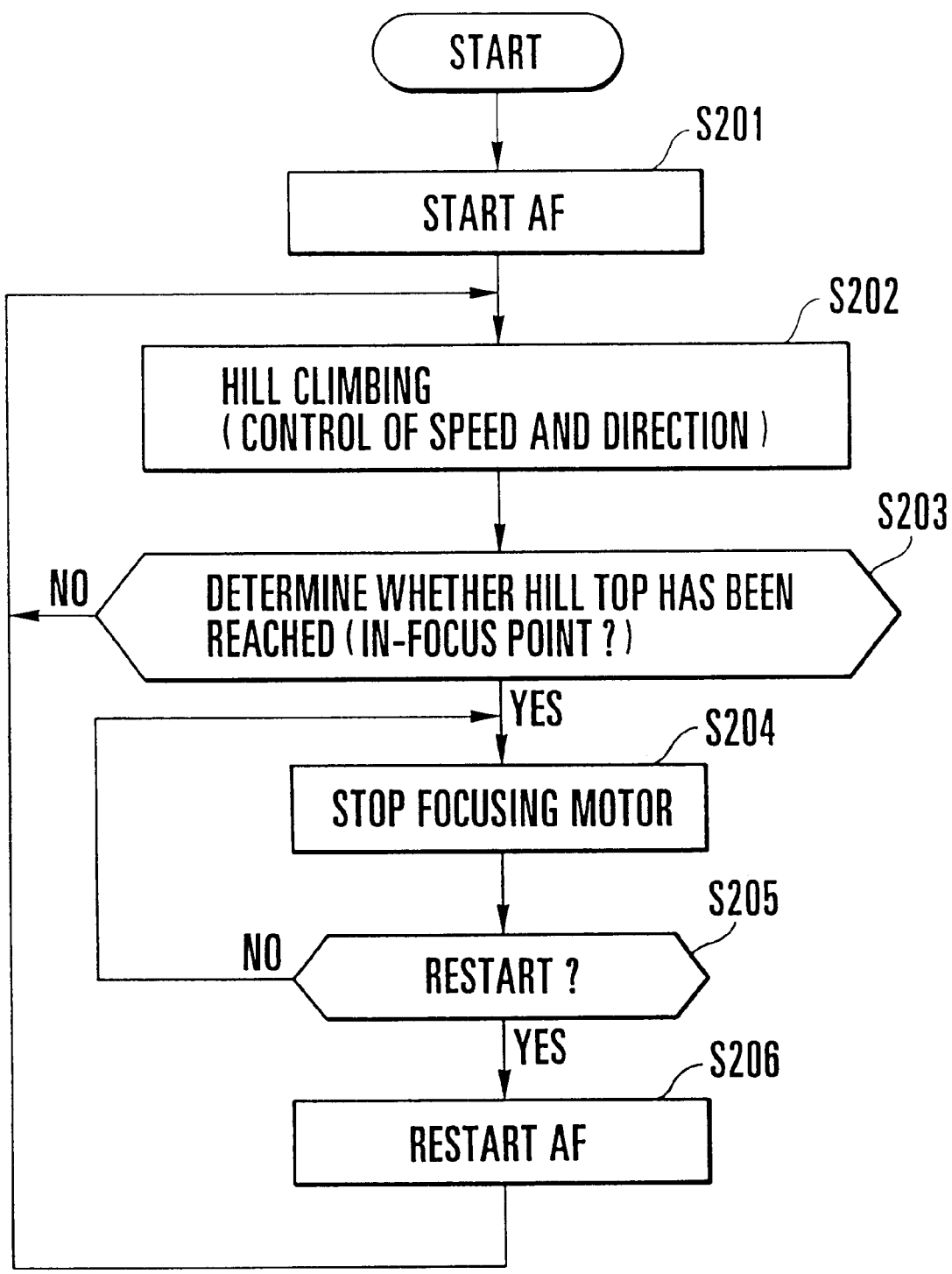
FIG. 20 is a flowchart aiding in describing an AF operation which is performed in the lens microcomputer 116 shown in FIG. 16.

The algorithm of the automatic focus adjusting operation performed by the lens microcomputer 116 in the lens unit 127 will be described below with reference to FIG. 20.

When the process is started, the lens microcomputer 116 first starts an AF operation in step S201, and then proceeds to Step S202. In Step S202, the lens microcomputer 116 compares TE and FE peak levels to a predetermined threshold and determines whether the focusing lens is in a greatly defocused state or in the vicinity of an in-focus point or how far the position of the focusing lens is away from the in-focus point, and performs speed control of the focusing lens.

At this time, if the TE peak level is low and the focusing lens is expected to be located at the foot of a hill, i.e., to be in a greatly defocused state, the FE line peak integral evaluation value is mainly used to perform direction control, thereby executing hill-climbing control of the focusing lens. When the focusing lens approaches the top of the hill and the TE peak level rises to a predetermined extent, the TE line peak integral evaluation value is used to execute hill-climbing control of the focusing lens so that the in-focus point can be detected highly accurately.

When the focusing lens reaches a vicinity of the in-focus point, the process proceeds to Step S203, in which it is determined whether the focusing lens has reached the top of the hill, by using the absolute value of the TE/FE peak evaluation value and the amount of variation of the TE line peak integral evaluation value. If it is determined that the focusing lens has reached the top of the hill, i.e., the in-focus point which is a point of maximum evaluation value level, the focusing lens is made to stop in Step S204, and the process enters a restart standby state in Step S205.

If, in the restart standby state, it is detected that the level of the TE/FE peak evaluation value has become a predetermined level lower than the peak value obtained when the in-focus point was detected, the process proceeds to Step S206, in which the driving of the focusing lens is restarted.

By repeating the above-described processing, it is possible to perform an AF operation at all times. In the loop of this automatic focus adjusting operation, the extent to which speed control is made to work by using the TE/FE peak evaluation value, an absolute level on the basis of which it is determined whether the top of a hill has been reached, the amount of variation of the TE line peak integral evaluation value and the like are determined on the basis of a prediction obtained by predicting the size of the hill through a decision which is made as to the state of a subject by using the Y-signal peak evaluation value or the Max–Min evaluation value.

As is apparent from the above description, according to the above-described embodiment, in a lens unit, the state of focus is detected on the basis of a focus evaluation value transmitted from a camera body and the driving of the a focusing lens group is controlled, and the size of a focus detecting area is determined by area control means in the lens unit and is transferred from the lens unit to the camera body. Accordingly, by controlling the position of the focus detecting area in the camera body and controlling the size of the focus detecting area in the lens unit according to the focal length thereof, it is possible to set a focus detecting area having an optimum size according to the characteristics of individual lens units to be secured to the camera body, and according to various functions of the camera body, such as electronic zoom. It is, therefore, possible to provide an interchangeable lens system which is capable of stably bringing an intended main subject into focus under any photographic condition irrespective of the kind of subject, whatever kind of lens unit is secured to the camera body or even if a different kind of camera body is connected to the same lens unit.

In addition, according to the above-described embodiment, since the size of the focus detecting area is varied to an optimum value according to the focal length of the lens unit, even if a zooming operation is performed, an optimum in-focus state can be highly accurately maintained at all times.

Further, according to the above-described embodiment, it is possible to realize an interchangeable lens system which is capable of maintaining stable AF performance irrespective of a variation of the focal length due to zooming even if a lens unit of extremely high magnification is secured to the camera body or an image is enlarged at a high magnification by electronic zoom.

In addition, according to the above-described embodiment, on a camera-body side, a focus signal inside a focus detecting area in an image plane is extracted from a picked-up image signal outputted from image pickup means, and the size of the focus detecting area is controlled on the basis of predetermined information indicative of the size of the focus detecting area, which information is received from a lens unit, and an output of extraction means which corresponds to the determined focus detecting area is transmitted to the lens unit. Accordingly, it is possible to set a focus detecting area having an optimum size according to the characteristics of individual lens units to be secured to the camera body, and according to various functions of the camera body, such as electronic zoom. It is, therefore, possible to provide an interchangeable lens system which is capable of stably bringing an intended main subject into focus under any photographic condition irrespective of the kind of subject, whatever kind of lens unit is secured to the camera body or even if a different kind of camera body is connected to the same lens unit.

Further, according to the above-described embodiment, since the setting position of the focus detecting area in the image plane can be varied on the camera-body side, it is possible to realize an interchangeable lens system which is capable of maintaining stable AF performance irrespective of a variation of the focal length due to zooming even if a lens unit of extremely high magnification is secured to the camera body or an image is enlarged at a high magnification by electronic zoom.

In addition, according to the above-described embodiment, a focus signal inside a focus detecting area is transmitted from a camera-body side to a lens-unit side, and in the lens unit, the state of focus is detected on the basis of the focus signal transmitted from the camera body and the driving of a focusing lens group is controlled. In addition, the size of the focus detecting area is determined by area control means in the lens unit and is transferred from the lens unit to the camera body, and on the camera-body side, the size of the focus detecting area is controlled on the basis of information indicative of the size of the focus detecting area. Accordingly, it is possible to set a focus detecting area having an optimum size according to the characteristics of individual lens units to be secured to the camera body, and according to various functions of the camera body, such as electronic zoom. It is, therefore, possible to provide an interchangeable lens system which is capable of stably bringing an intended main subject into focus under any photographic condition irrespective of the kind of subject, whatever kind of lens unit is secured to the camera body or even if a different kind of camera body is connected to the same lens unit.

Further, according to the above-described embodiment, since the size of the focus detecting area can be varied to an optimum value according to the focal length of the lens unit, it is possible to realize an interchangeable lens system which is capable of maintaining stable AF performance irrespective of a variation of the focal length due to zooming even if a lens unit of extremely high magnification is secured to the camera body or an image is enlarged at a high magnification by electronic zoom.

In addition, according to the above-described embodiment, the position of the focus detecting area in the image plane is determined on the camera-body side, and the size of the focus detecting area in the image plane is determined on the lens-unit side, and focus detection is performed on the lens-unit-side on the basis of a focus signal extracted from the focus detecting area, so that it is possible to set a focus detecting area of optimum size according to the characteristics of individual lens units to be secured to the camera body, and according to various functions of the camera body, such as electronic zoom. It is, therefore, possible to provide an interchangeable lens system which is capable of stably bringing an intended main subject into focus under any photographic condition irrespective of the kind of subject, whatever kind of lens unit is secured to the camera body or even if a different kind of camera body is connected to the same lens unit.

What is claimed is:

1. A lens unit which is removably secured to a camera body comprising:

a magnification varying lens for performing a magnification varying operation;

a communication device for communicating data with said camera body; and a transmitting device for transmitting information relative to an amount of variation per unit time of a focal length of said magnification varying lens to said camera body via said communication device, the amount of variation per unit time being a value of the vicinity of telephoto end of the magnification varying lens stored in a memory of said lens unit as a value that represents amounts of variation per unit time of the focal length of said magnification varying lens, whereby a magnification varying rate of an electronic-zoom device arranged in the camera body is controlled on the basis of the transmitted information.

2. A lens unit according to claim 1, wherein said control device is arranged to transmit to said camera body the information relative to the amount of variation per unit time of the focal length of said magnification varying lens and information relative to a position of said magnification varying lens.

3. A lens unit according to claim 2, wherein the information relative to the position of said magnification varying lens is information indicating whether said magnification varying lens is located at its telephoto end.

4. A lens unit according to claim 1, wherein said magnification varying lens is capable of operating at a plurality of speeds, and the information relative to the amount of variation per unit time of the focal length of said magnification varying lens includes a plurality of pieces of information which respectively correspond to the plurality of speeds of said magnification varying lens.

5. A camera to which a lens unit is removably secured, comprising:

an image pickup device;

an electronic-zoom device for electrically varying a magnification of an image signal outputted from said image pickup device;

a communication device for receiving from said lens unit information relative to an amount of variation per unit time of a focal length of a magnification varying lens provided in said lens unit, the amount of variation per unit time being a value of the vicinity of telephoto end of the magnification varying lens stored in a memory of said lens unit as a value that represents amounts of variation per unit time of the focal length of said magnification varying lens; and a control device for controlling a magnification variation rate of said electronic-zoom device on the basis of the information received said lens unit by said communication device, such that the magnification variation rate of said electronic-zoom device is substantially equal to that of said magnification varying lens.

6. A camera according to claim 5, wherein said communication device also receives information relative to a position of said magnification varying lens from said lens unit, and said control device controls the magnification variation rate of said electronic-zoom device on the basis of the information relative to the amount of variation per unit time of the focal length of said magnification varying lens and the information relative to the position of said magnification varying lens.

7. A camera according to claim 6, wherein the information relative to the position of said magnification varying lens is information indicating whether said magnification varying lens is located at its telephoto end.

8. A camera according to claim 5, wherein said magnification varying lens is capable of operating at a plurality of speeds, and the information relative to the amount of variation per unit time of the focal length of said magnification varying lens includes a plurality of pieces of information which respectively correspond to the plurality of speeds of said magnification varying lens.

9. An image pickup apparatus having a camera body and a lens unit detachably mounted on said camera body, comprising:

a magnification varying lens in said lens unit for performing a magnification varying operation;

an image pickup device in said camera body;

an electronic-zoom device for electrically varying a magnification of an image signal outputted from said image pickup device;

a communication device, arranged in said lens unit, for transmitting an amount of variation per unit time of a focal length of said magnification varying lens to said camera body, the amount of variation per unit time being a value of the vicinity of telephoto end of the magnification varying lens stored in a memory of said lens unit as a value that represents amounts of variation per unit time of the focal length of said magnification varying lens; and a control device for controlling a magnification variation rate of said electronic-zoom device on the basis of information relative to an amount of variation per unit time of a focal length of said magnification varying lens received through said communication device to match the zooming characteristics of said magnification varying lens and said electronic-zoom device to each other.

10. An image pickup apparatus according to claim 9, wherein said control device controls the magnification variation rate of said electronic-zoom device on the basis of the information relative to the amount of variation per unit time of the focal length of said magnification varying lens and information relative to a position of said magnification varying lens.

11. An image pickup apparatus according to claim 10, wherein the information relative to the position of said magnification varying lens is information indicating whether said magnification varying lens is located at its telephoto end.

12. An image pickup apparatus according to claim 9, wherein said magnification varying lens is capable of operating at a plurality of speeds, and the information relative to the amount of variation per unit time of the focal length of said magnification varying lens includes a plurality of pieces of information which respectively correspond to the plurality of speeds of said magnification varying lens.

13. An image pickup apparatus comprising:

a lens unit including a magnification varying lens capable of varying its focal length at a plurality of speeds;

a camera body to which said lens unit is secured, including an image pickup element and a signal processing circuit for electronically magnifying an image by performing a predetermined process;

a communication device for selecting either one of a first communication mode for mainly communicating information peculiar to said lens unit and a second communication mode for mainly communicating information indicative of control and a state of said lens unit; and a control device provided in said camera body and arranged to obtain, if said first communication mode is selected, information relative to amounts of variations per unit time of a focal length of said magnification varying lens unit which respectively correspond to the plurality of speeds of said magnification varying lens from said lens unit to control said signal processing circuit to match an electronically magnifying characterstic to a magnifying characteristic of said magnification varying lens, wherein the amount of variation per unit time are values of the vicinity of telephoto end of the magnification varying lens stored in a memory of said lens unit as values that represent amounts of variation per unit time of the focal length of said magnification varying lens.

14. An image pickup apparatus according to claim 13, wherein said control device is arranged to obtain information relative to a position of said magnification varying lens if said second communication mode is selected.

15. An image pickup apparatus according to claim 14, wherein the information relative to the position of said magnification varying lens is information indicating whether said magnification varying lens is located at its telephoto end.

* * * * *

UNITED STATES PATENT AND TRADEMARK OFFICE
CERTIFICATE OF CORRECTION

PATENT NO.     : 6,445,416 B1
DATED          : September 3, 2002
INVENTOR(S)    : Kenji Kyuma et al.

It is certified that error appears in the above-identified patent and that said Letters Patent is hereby corrected as shown below:

<u>Column 13,</u>
Line 43, delete "IMC" and insert -- LMC --.

Signed and Sealed this

Eleventh Day of November, 2003

JAMES E. ROGAN
*Director of the United States Patent and Trademark Office*